(12) United States Patent
Nagashii et al.

(10) Patent No.: US 7,111,701 B2
(45) Date of Patent: Sep. 26, 2006

(54) MOTORCYCLE

(75) Inventors: Toshihisa Nagashii, Saitama (JP);
Hiroshi Nakagome, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 10/801,721

(22) Filed: Mar. 17, 2004

(65) Prior Publication Data
US 2004/0206564 A1 Oct. 21, 2004

(30) Foreign Application Priority Data
Mar. 31, 2003 (JP) ............... 2003-095109

(51) Int. Cl.
*B62K 21/00* (2006.01)
(52) U.S. Cl. .................. 180/219; 180/309; 60/313; 60/314
(58) Field of Classification Search ............ 180/219, 180/220, 296, 309; 60/292, 312–314, 323, 60/324
See application file for complete search history.

(56) References Cited

U.S. PATENT DOCUMENTS

| | | | | |
|---|---|---|---|---|
| 4,336,864 A | * | 6/1982 | Asaka et al. ............ | 181/241 |
| 4,817,374 A | * | 4/1989 | Kitta ..................... | 60/313 |
| 4,860,538 A | * | 8/1989 | Takeuchi ................ | 60/313 |
| 4,896,504 A | * | 1/1990 | Matsui .................... | 60/313 |
| 4,941,319 A | * | 7/1990 | Yamamoto et al. ......... | 60/314 |
| 5,595,062 A | * | 1/1997 | Chabry .................... | 60/313 |
| 5,630,571 A | * | 5/1997 | Kipp et al. ................ | 251/214 |
| 6,250,076 B1 | * | 6/2001 | Kawamata et al. ......... | 60/304 |
| 6,378,471 B1 | * | 4/2002 | Yamada et al. ......... | 123/65 PE |
| 6,609,367 B1 | * | 8/2003 | Nakayasu et al. ......... | 60/324 |
| 6,772,588 B1 | * | 8/2004 | Yamada et al. ........... | 60/313 |

FOREIGN PATENT DOCUMENTS

JP 2002-138828 A 5/2002

* cited by examiner

*Primary Examiner*—Lesley D. Morris
*Assistant Examiner*—L. Lum
(74) *Attorney, Agent, or Firm*—Birch, Stewart, Kolasch and Birch, LLP

(57) ABSTRACT

A motorcycle includes an axle of a rear wheel supported for rotation at a rear end of a swing arm. The swing arm is supported at a front end portion thereof for rocking motion on a vehicle body frame. A rear end exhaust portion of an exhaust system connected to a cylinder head provided on an engine body carried on the vehicle body frame forwardly of the rear wheel is disposed at a position higher than the axle. An exhaust control valve for adjusting the flow area in an exhaust pipe, which forms part of the exhaust system, is disposed in the exhaust pipe. The exhaust control valve is disposed forwardly and upwardly of the axle of the rear wheel to dispose the exhaust control valve in a better environment.

24 Claims, 19 Drawing Sheets

MOTORCYCLE

BACKGROUND OF THE INVENTION

1. Field of the Invention

The present invention relates to a motorcycle, wherein an axle of a rear wheel is supported for rotation at a rear end of a swing arm supported at a front end portion thereof for rocking motion on a vehicle body frame. A rear end exhaust portion of an exhaust system connected to a cylinder head provided on an engine body carried on the vehicle body frame forwardly of the rear wheel is disposed at a position higher than the axle. Furthermore, an exhaust control valve for adjusting the flow area in an exhaust pipe which forms part of the exhaust system is disposed in the exhaust pipe.

2. Description of Background Art

A motorcycle as described above has been described in, for example, Japanese Patent Laid-Open No. 2002-138828.

In the motorcycle described in the above document; however, the exhaust control valve is disposed on the lower side forwardly of the axle of the rear wheel and the exhaust control valve is positioned close to the rear wheel and the supporting surface of the rear wheel. Therefore, the exhaust control valve is in an environment wherein it is liable to be exposed to dust, rainwater and so forth. In addition, the exhaust control valve in the above document, which has a sliding portion, is preferably disposed in a better environment.

SUMMARY OF THE INVENTION

The present invention has been made in view of the above described circumstance. It is an object of the present invention to provide a motorcycle, wherein an exhaust control valve can be disposed in a better environment.

In order to attain the object described above, according to the present invention, there is provided a motorcycle, wherein an axle of a rear wheel is supported for rotation at a rear end of a swing arm supported at a front end portion thereof for rocking motion on a vehicle body frame. A rear end exhaust portion of an exhaust system connected to a cylinder head provided on an engine body carried on the vehicle body frame forwardly of the rear wheel is disposed at a position higher than the axle. Furthermore, an exhaust control valve for adjusting the flow area in an exhaust pipe which forms part of the exhaust system is disposed in the exhaust pipe, wherein the exhaust control valve is disposed forwardly and upwardly of the axle of the rear wheel.

According to the above described configuration, the exhaust control valve can be disposed at a position where it is not likely to be influenced by the rear wheel and is spaced far away from the supporting surface of the rear wheel. Accordingly, the exhaust control valve can be disposed in a good environment, wherein a bad influence from the rear wheel and the supporting surface is less likely to have an effect on operation of the exhaust control valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
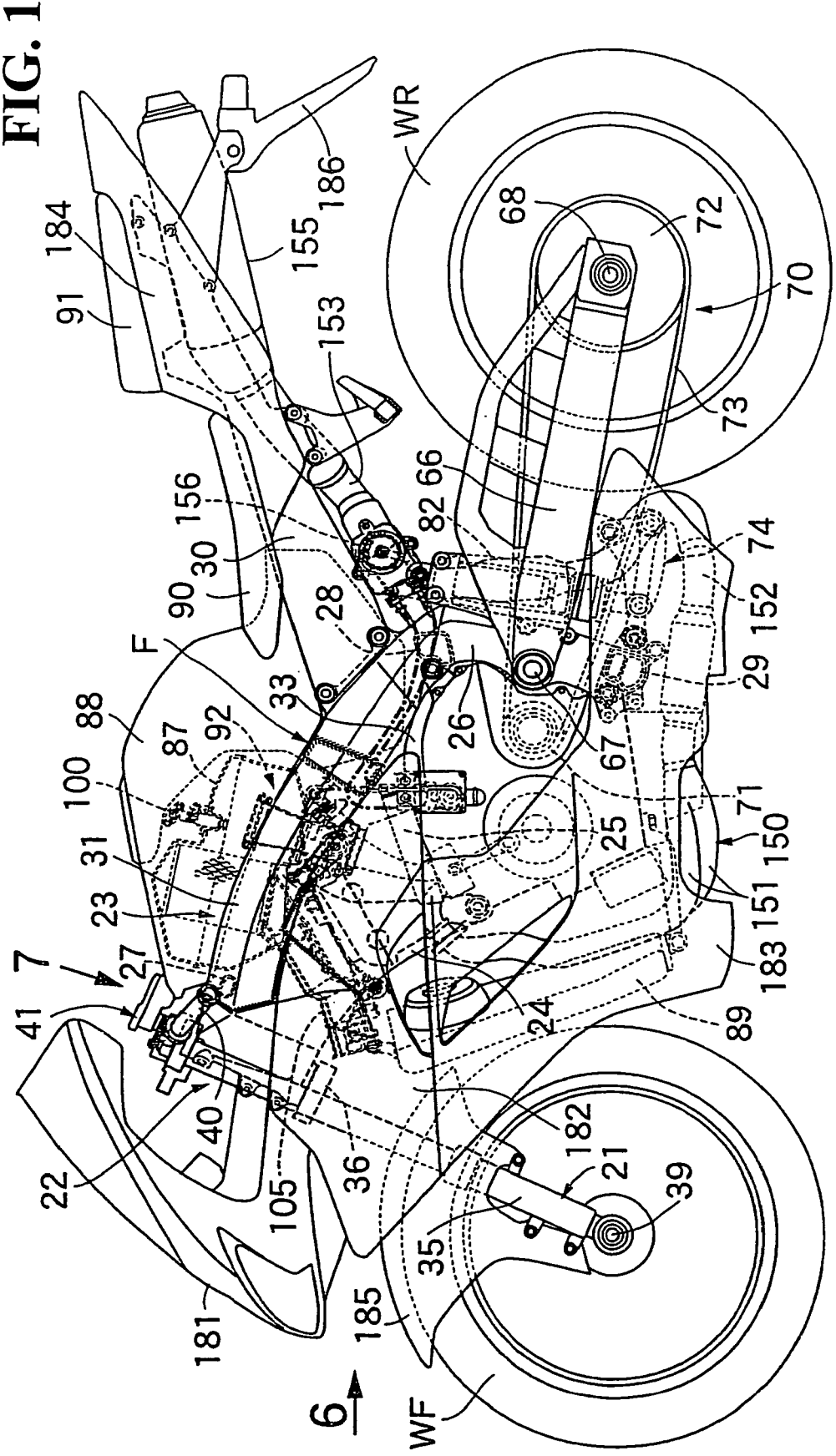
FIG. 1 is a side elevational view of a motorcycle.

In the following, an embodiment of the present invention will be described with reference to the accompanying drawings. It should be noted that the same reference numerals have been used to identify the same or similar elements throughout the several views.

Figure 2:
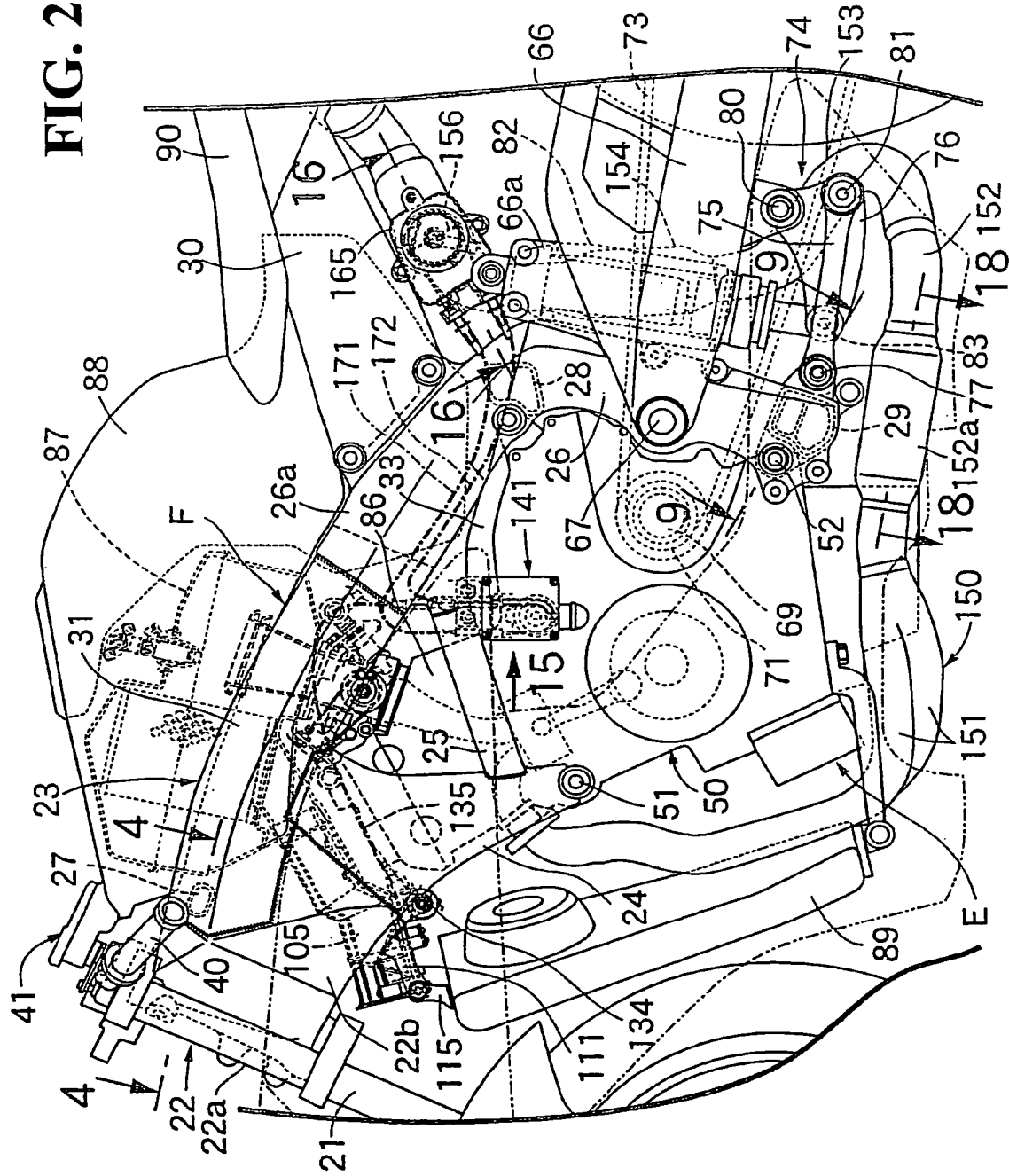
FIG. 2 is an enlarged view of a part of FIG. 1.
Figure 3:
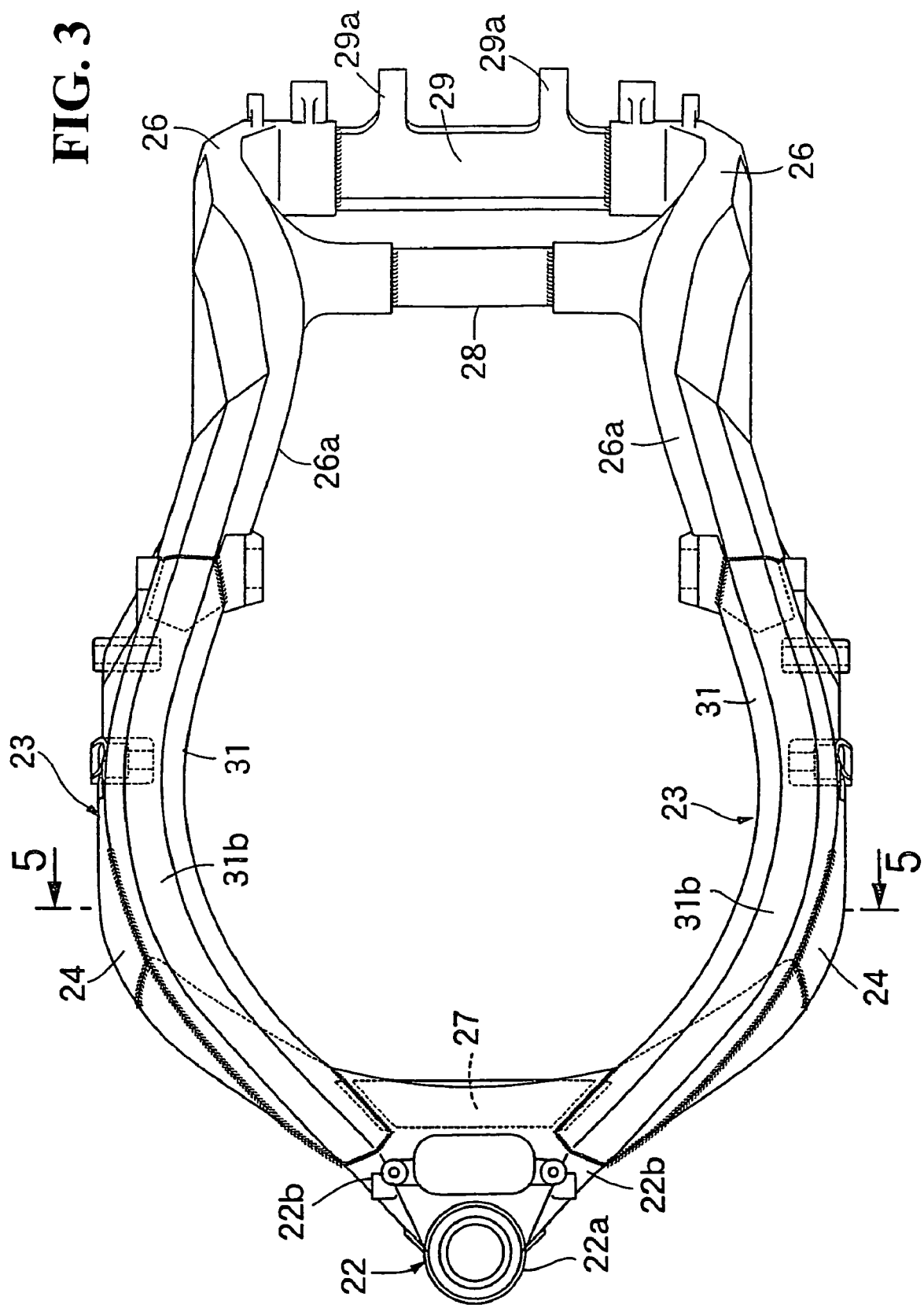
FIG. 3 is a plan view of a front portion of a vehicle body frame.

Referring first to FIGS. 1 to 3, a vehicle body frame F of the motorcycle includes a head pipe 22 for supporting a front fork 21, on which a front wheel WF is supported for rotation to steer the motorcycle. A pair of left and right main frames 23, 23 extend rearwardly downwards from the head pipe 22. The vehicle body frame F further includes a pair of left and right engine hangers 24, 24 welded to front portions of the head pipe 22 and the main frames 23 and extending downwardly from the main frames 23. Connecting pipes 25 are provided for interconnecting supporting plate portions 33 provided at lower portions of the engine hangers 24 and rear portions of the main frames 23. The vehicle body frame F further includes a pair of left and right pivot plates 26 extending downwardly from rear portions of the main frames 23, a first cross pipe 27 extending between front portions of the main frames 23, a second cross pipe 28 extending between upper portions of the pivot plates 26, and a third cross pipe 29 provided between lower portions of the pivot plates 26. The vehicle body frame F further includes a pair of left and right seat rails 30 extending rearwardly upwards and connected to rear portions of the main frames 23.

Figure 4:
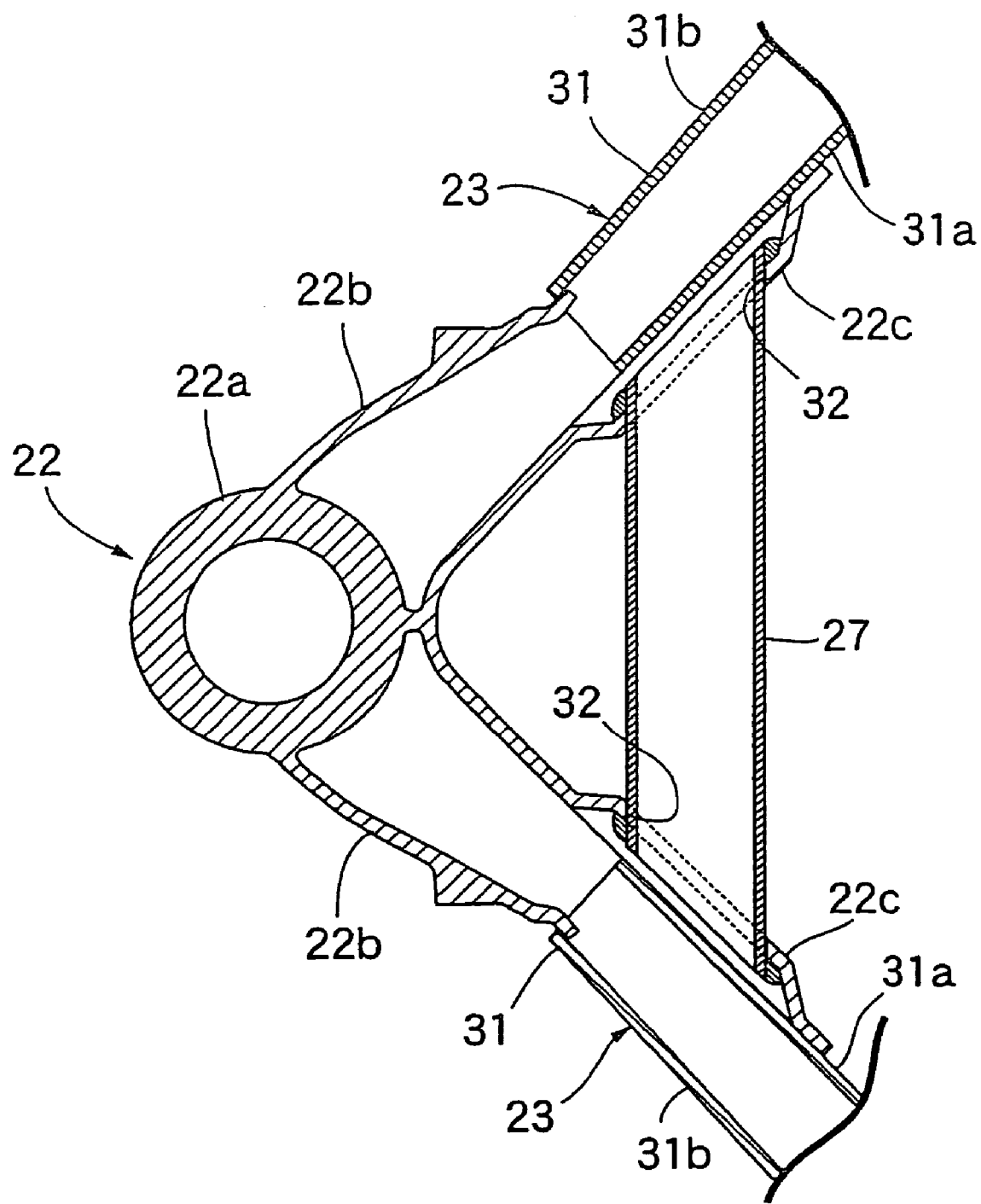
FIG. 4 is an enlarged sectional view of the front portion of the vehicle body frame taken along line 4—4 in FIG. 2.

Referring to FIG. 4, the head pipe 22 includes a cylindrical portion 22a on which the front fork 21 is supported for steering the motorcycle and a pair of left and right gussets 22b, 22b integrally extending rearwardly downwards from the cylindrical portion 22a. Each of the main frames 23 includes one of the gussets 22b, a pipe member 31 to which a front end portion of the gusset 22b is welded, and a pipe portion 26a provided integrally on one of the pivot plates 26 and welded to a rear end portion of the pipe member 31.

In order to build the first cross pipe 27 between the front ends of the main frames 23, mounting holes 32, 32 are provided coaxially in inner side walls of the main frames 23. The first cross pipe 27 is fitted in the mounting holes 32, 32 and welded at the opposite end portions thereof to the inner side walls of the main frames 23, 23.

Incidentally, extensions 22c are provided integrally on the gussets 22b, 22b of the head pipe 22 in such a manner as to construct inner side walls of front portions of the main frames 23, 23. The extensions 22c extend rearwardly such that they are positioned inwardly of the inner side walls of the front portions of the pipe members 31, 31. The mounting holes 32, 32 for receiving the opposite end portions of the first cross pipe 27 are provided in the extensions 22c, 22c such that the opposite ends thereof are opposed to the inner side walls of the front portions of the pipe members 31, 31. The opposite end portions of the first cross pipe 27 are welded to outer faces of the extensions 22c, 22c.

Figure 5:
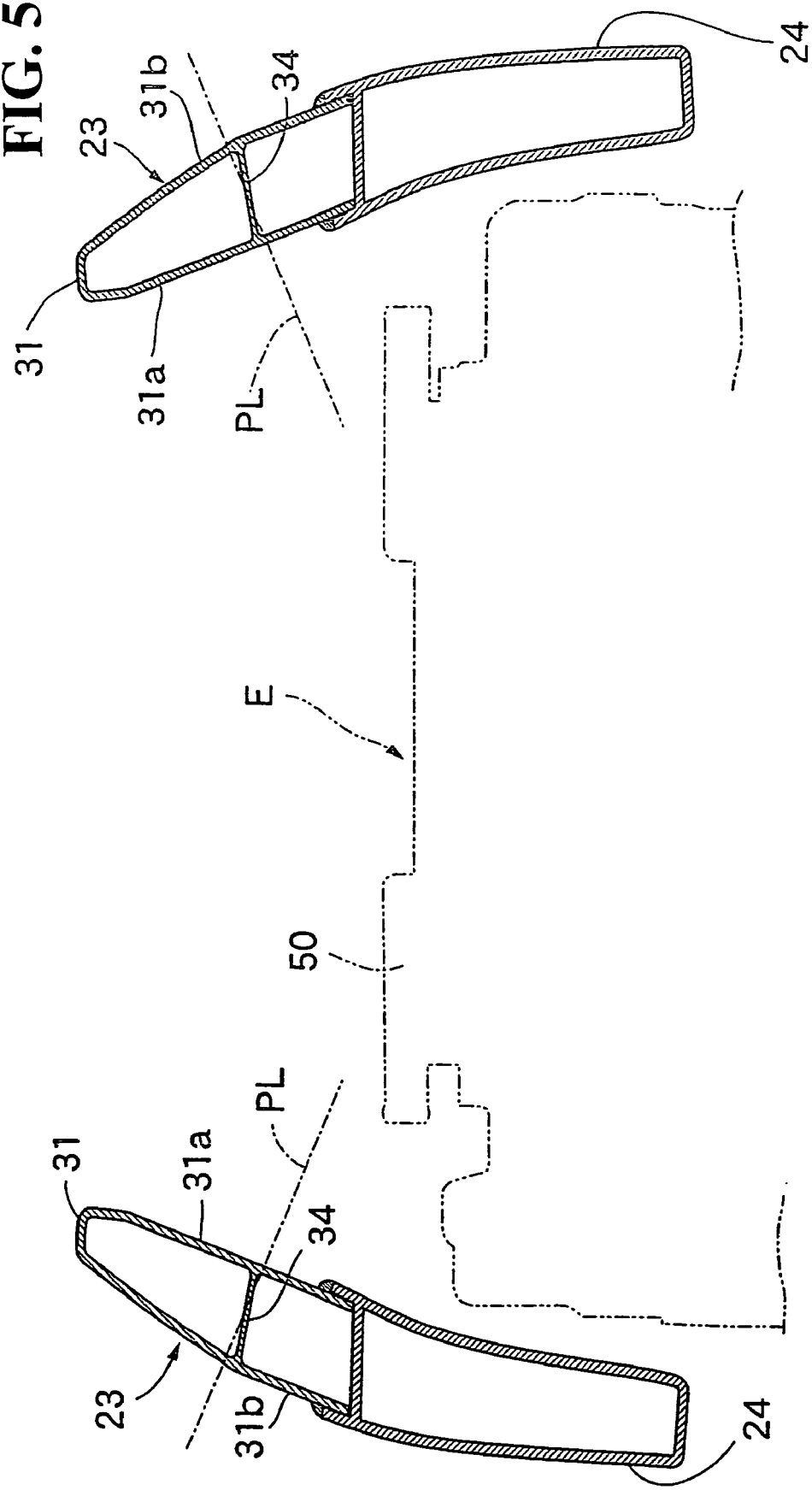
FIG. 5 is a sectional view taken along line 5—5 in FIG. 3.

Referring also to FIG. 5, the pipe member 31 is shaped such that it has an outer cross-sectional shape in the form of an angular tube, for example, by conventionally known extrusion or drawing of an ingot of aluminum alloy. A rib 34 is provided integrally on and between the inner side faces of an intermediate portion of the pipe member 31 in the upward and downward direction such that it vertically partitions the inside of the pipe member 31. It is to be noted that, at the portion to which an engine hanger 24 is welded, a lower portion of the pipe member 31 is cut away such that it is open downwardly, that is, toward the engine hanger 24 side.

Incidentally, the pipe member 31 has an inner side wall 31a which is flat over substantially the entire length of the pipe member 31 in the upward and downward direction and an outer side face 31b extend substantially along the inner side wall 31a and is formed so as to have a vertically elongated, angular tubular shape. The pipe member 31 is bent in a plane PL perpendicular to the inner side wall 31a such that an intermediate portion thereof in the longitudinal direction may be curved in an outwardly convex shape. In addition, the pipe members 31, 31 after they are bent are provided contiguously to the gussets 22b, 22b of the head pipe 22 in an inclined relationship such that they come close to each other upwardly.

Figure 6:
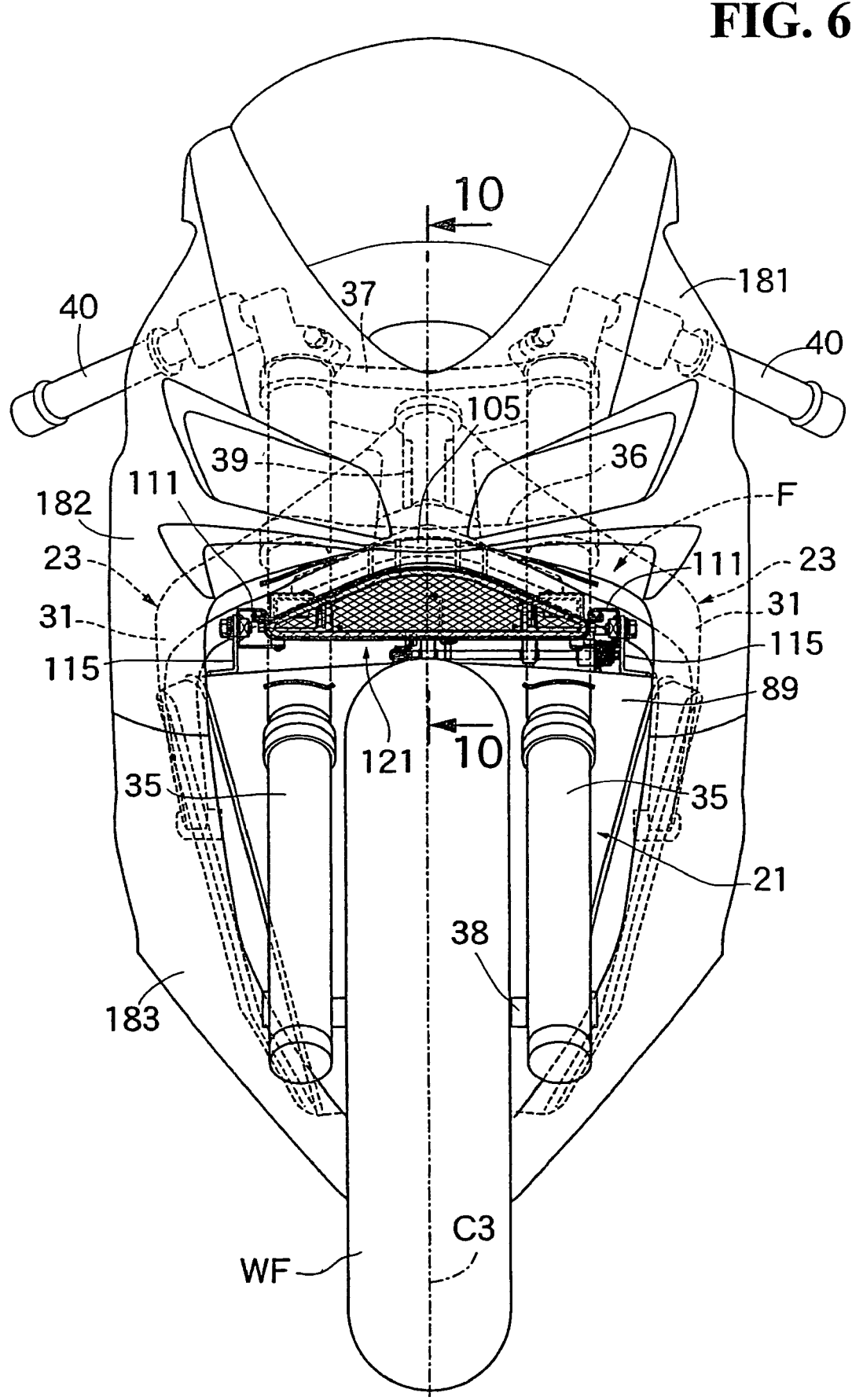
FIG. 6 is an enlarged view in the direction of an arrow 6 in FIG. 1.

Referring to FIG. 6, the front fork 21 includes cushion units 35, 35 extending vertically on the opposite left and right sides of the front wheel WF, a bottom bridge 36 for interconnecting the cushion units 35 above the front wheel WF, and a top bridge 37 for interconnecting upper portions of the cushion units 35, 35. An axle 38 of the front wheel WF is supported for rotation between the lower end portions of the cushion units 35, 35.

Figure 7:
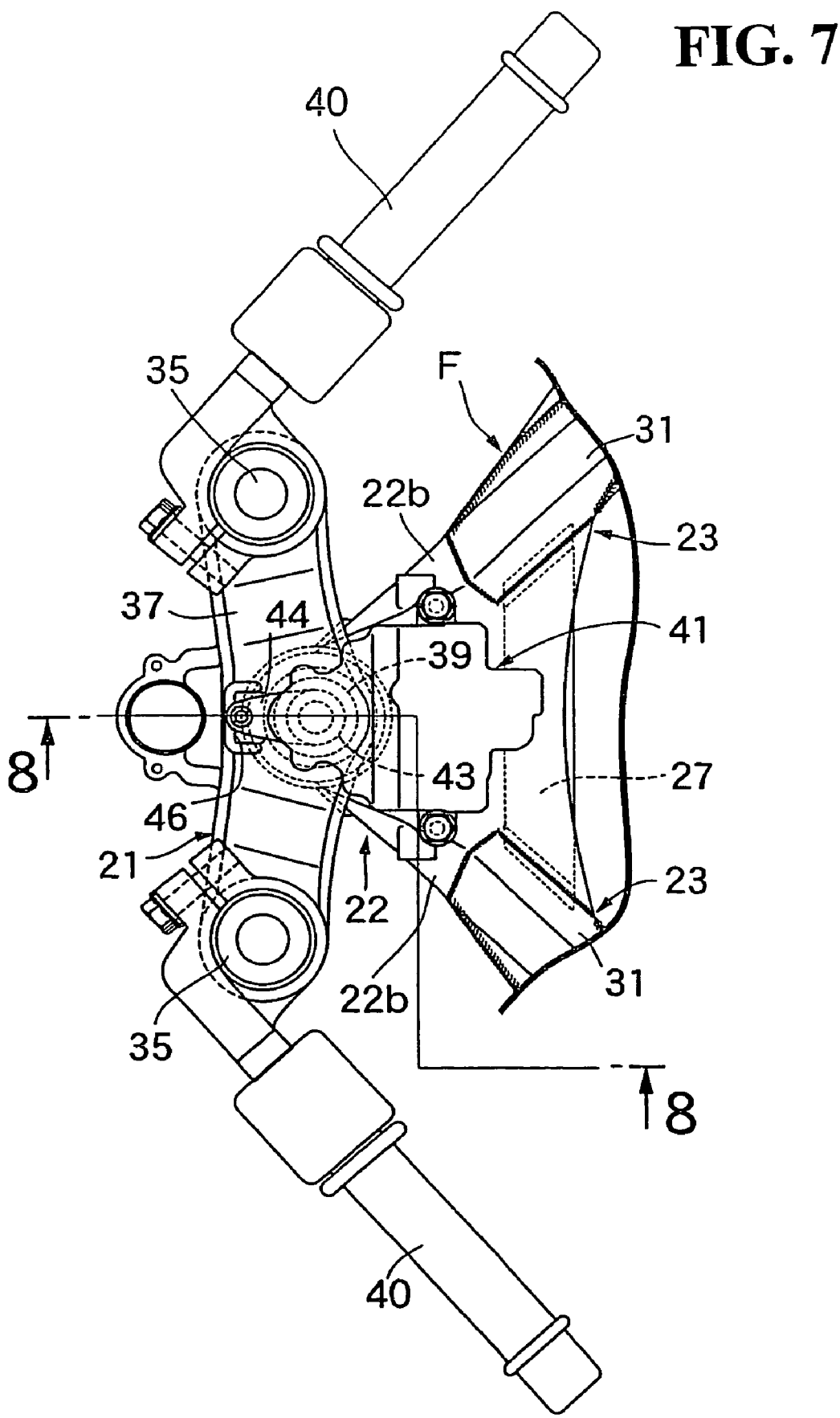
FIG. 7 is an enlarged view in the direction of an arrow 7 in FIG. 1.
Figure 8:
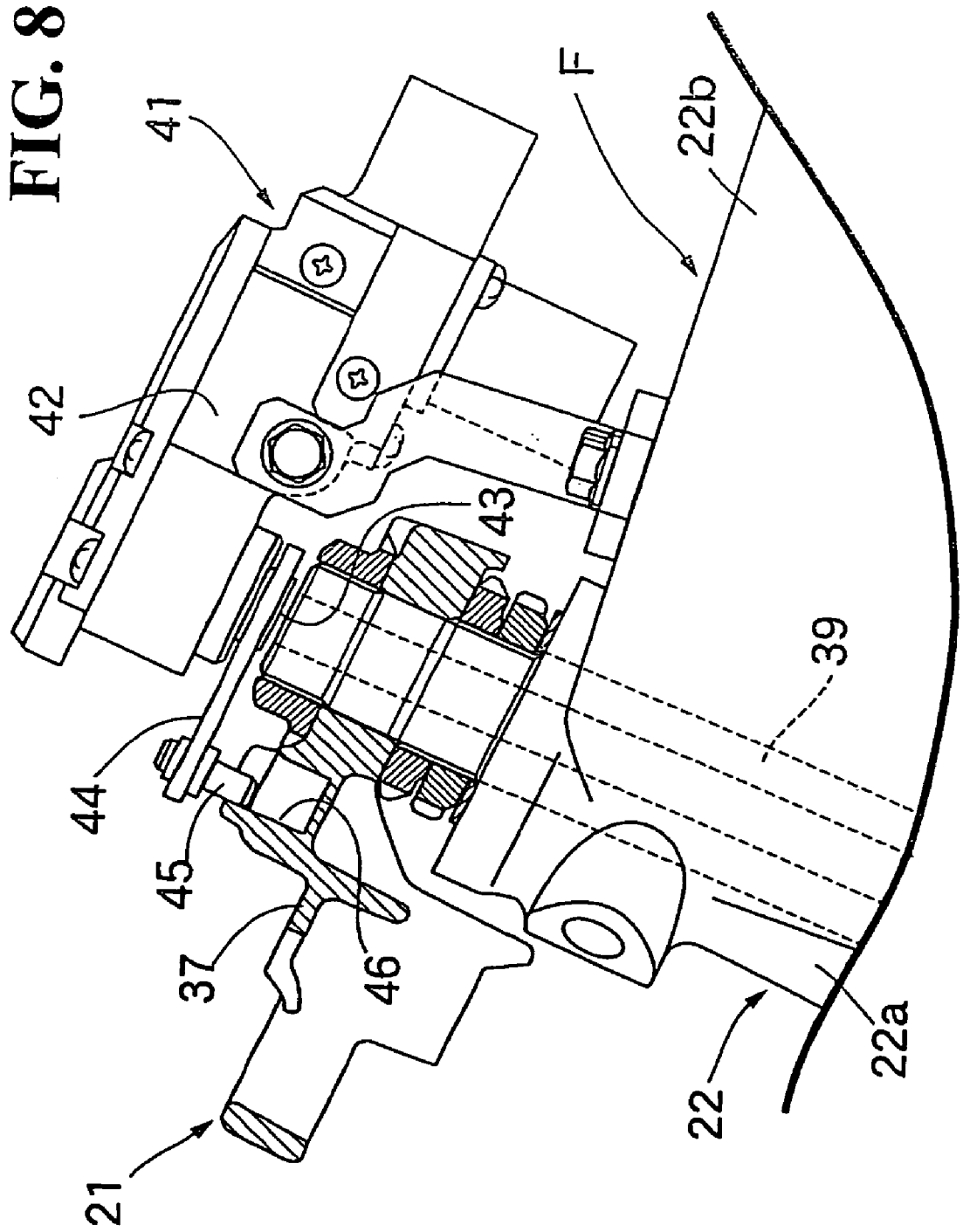
FIG. 8 is a sectional view taken along line 8—8 in FIG. 7.

Referring also to FIGS. 7 and 8, a steering shaft 39 is provided between the bottom bridge 36 and the top bridge 37 on the rear side of a central location between the cushion units 35, 35 and extends in parallel to the cushion units 35, 35. The steering shaft 39 is supported for rotation by the cylindrical portion 22a of the head pipe 22.

A pair of left and right steering handle bars 40, 40 each in the form of a bar are connected to upper end portions of the cushion units 35, 35 above the bottom bridge 36. Furthermore, a steering damper 41 is provided between a front end portion of the vehicle body frame F, that is, the head pipe 22, and the top bridge 37 of the front fork 21.

The steering damper 41 includes a housing 42 fixedly supported on the head pipe 22 and having a hydraulic shock absorber built therein. A pivot shaft 43 is supported for rotation on the housing 42 and disposed coaxially above the steering shaft 39. An arm 44 has a base end portion secured to the pivot shaft 43 and extending forwardly. The steering damper 41 further includes a resilient roller 45 supported for rotation at an end of the arm 44. A recess 46 is provided on an upper face of a central portion of the top bridge 37 for fitting in frictional contact with an outer circumferential face of the resilient roller 45.

Rotational oscillations around an axis of the steering shaft 39 transmitted from the front wheel WF side to the top bridge 37 are attenuated by the hydraulic shock absorber in the housing 42 through the arm 44.

Referring back to FIG. 2, an engine body 50 of a multi-cylinder engine E wherein, for example, four cylinders are arranged in parallel in the widthwise direction of the vehicle body frame F is supported at lower portions of the engine hangers 24 and upper portions and lower portions of the pivot plates 26. The engine body 50 is fastened to the lower portions of the engine hangers 24 by means of pairs of left and right bolts 51, 51.

Figure 9:
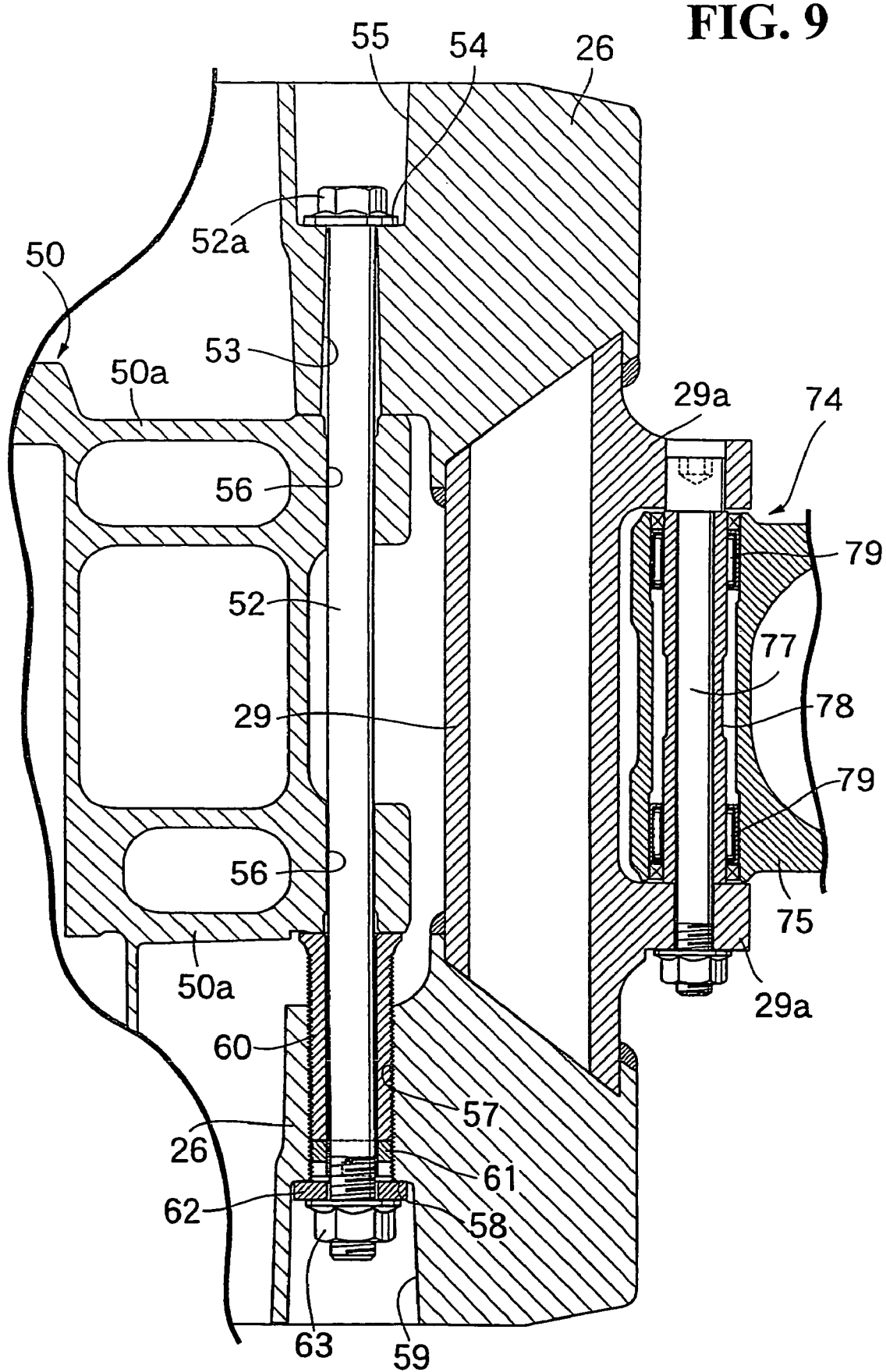
FIG. 9 is a sectional view taken along line 9—9 in FIG. 2.

Referring to FIG. 9, in order to support the engine body 50 at the lower portions of the pair of pivot plates 26, 26 disposed on the opposite sides of the engine body 50, an insertion hole 53 into which a mount bolt 52 is to be inserted and a first arresting portion 54 surrounding an outer end of the insertion hole 53 are provided at a lower portion of one of the two pivot plates 26, 26 (in the present working example, the pivot plate 26, 26 which is disposed on the right side as viewed in a forward direction of the advancing direction of the motorcycle). In particular, the insertion hole 53 and a first insertion hole 55 are provided coaxially at a lower portion of the one pivot plate 26 such that the insertion hole 53 is open to the inner side face of the one pivot plate 26 while the first insertion hole 55 is open to the outer side face of the one pivot plate 26 and has a greater diameter than the insertion hole 53. The first arresting portion 54 is formed as an annular stepped portion opposed to the first insertion hole 55 side between an outer end of the insertion hole 53 and an inner end of the first insertion hole 55.

A pair of supporting arm portions 50a, 50a are disposed integrally on the engine body 50 in a spaced relationship from each other in the axial direction of the mount bolt 52 between the pivot plates 26, 26. Through-holes 56 for receiving the mount bolt 52 therein are provided coaxially in the supporting arm portions 50a, 50a.

A threaded hole 57 coaxial with the insertion hole 53 and a second arresting portion 58 surrounding an outer end of the threaded hole 57 are provided at a lower portion of the other pivot plates 26. In particular, the threaded hole 57 and a second insertion hole 59 are provided coaxially at a lower portion of the other pivot plate 26. The threaded hole 57 is open to the inner side face of the other pivot plate 26, and the second insertion hole 59 is open to the outer side face of the other pivot plate 26 and has a greater diameter than the threaded hole 57. The second arresting portion 58 is formed as an annular stepped portion opposed to the second insertion hole 59 side between the outer end of the threaded hole 57 and the inner end of the second insertion hole 59.

A cylindrical bolt 60 is screwed in the threaded hole 57 and has an end contacting with the engine body 50. In particular, while one of the supporting arm portions 50a contacts with the inner side face of the one pivot plate 26, the cylindrical bolt 60 is screwed into the threaded hole 57 such that the end thereof contacts with the other supporting arm portion 50a. Furthermore, a cylindrical check bolt 61 is screwed in the threaded hole 57 and contacts with the other end of the cylindrical bolt 60 to prevent the cylindrical bolt 60 from being loosened. In addition, the cylindrical bolt 60 and the check bolt 61 are screwed in the threaded hole 57 such that the other end of the cylindrical bolt 60 and the check bolt 61 may be positioned inwardly of the second arresting portion 58 while the engine body 50 is sandwiched between the inner side face of the one pivot plate 26 and one end of the cylindrical bolt 60.

The amount bolt 52 is fitted in the insertion hole 53, through holes 56, 56 of the engine body 50, cylindrical bolt 60, check bolt 61 and above-described threaded hole 57. An increased diameter head portion 52a at one end of the mount bolt 52 engages with one of the first and second arresting portions 54 and 58 while a nut 63 is screwed at the other end portion of the mount bolt 52 such that it engages with the other one of the first and second arresting portions 54 and 58. In the present working example, the other end portion of the mount bolt 52, which has an increased diameter head portion 52a engaging with the first arresting portion 54, projects from the threaded hole 57. The nut 63 screwed at a portion of the other end portion of the mount bolt 52 which projects from the threaded hole 57 is engaged with the second arresting portion 58 with a washer 62 interposed therebetween.

The supporting structure for the engine body 50 at the upper portions of the pivot plates 26, 26 is basically similar to the supporting structure at the lower portions of the pivot plates 26, 26 described above, and detailed description thereof is omitted herein.

A swing arm 66 is supported at a front end portion thereof for rocking motion through a support shaft 67 between intermediate portions of the pivot plates 26, 26 in the upward and downward direction. An axle 68 of a rear wheel WR is supported for rotation at a rear end portion of the swing arm 66.

Power from an output power shaft 69 of a speed change gear built in the engine body 50 is transmitted to the rear wheel WR through a chain power transmission 70. The chain power transmission 70 includes a driving sprocket wheel 71 secured to the output power shaft 69, a driven sprocket wheel 72 secured to the rear wheel WR, and an endless chain 73 extending between and around the sprocket wheels 71 and 72. The chain power transmission 70 is disposed on the left side of the engine E as viewed forwardly in the advancing direction of the motorcycle.

A linkage 74 is provided between the third cross pipe 29, which interconnects lower portions of the pivot plates 26, 26, and the swing arm 66. The linkage 74 includes a first link 75 and a second link 76. The first link 75 is connected at one end portion thereof to the third cross pipe 29 for pivotal motion around an axial line of a first connection shaft 77 parallel to the support shaft 67. The second link 76 is connected to a lower portion of the swing arm 66 for pivotal motion around an axial line of a second connection shaft 80 parallel to the first connection shaft 77 and is further connected to the other end portion of the first link 75 through a third connection shaft 81 parallel to the first and second connection shafts 77 and 80.

A pair of pivotal supporting portions 29a, 29a are provided integrally on the third cross pipe 29 and project rearwardly at two locations spaced from each other in the longitudinal direction of the third cross pipe 29. A collar 78 is mounted on the first connection shaft 77 provided between the pivotal supporting portions 29a, 29a and the first link 75 is supported at an end portion thereof on the collar 78 through a pair of roller bearings 79, 79.

The first link 75 is connected at the other end portion thereof to a rear portion of the second link 76 through the third connection shaft 81. A rear cushion unit 82 is connected at an upper end portion thereof to a bracket 66a provided at a front portion of the swing arm 66 and is connected at a lower end portion thereof to a front portion of the second link 76 through a fourth connection shaft 83.

Figure 10:
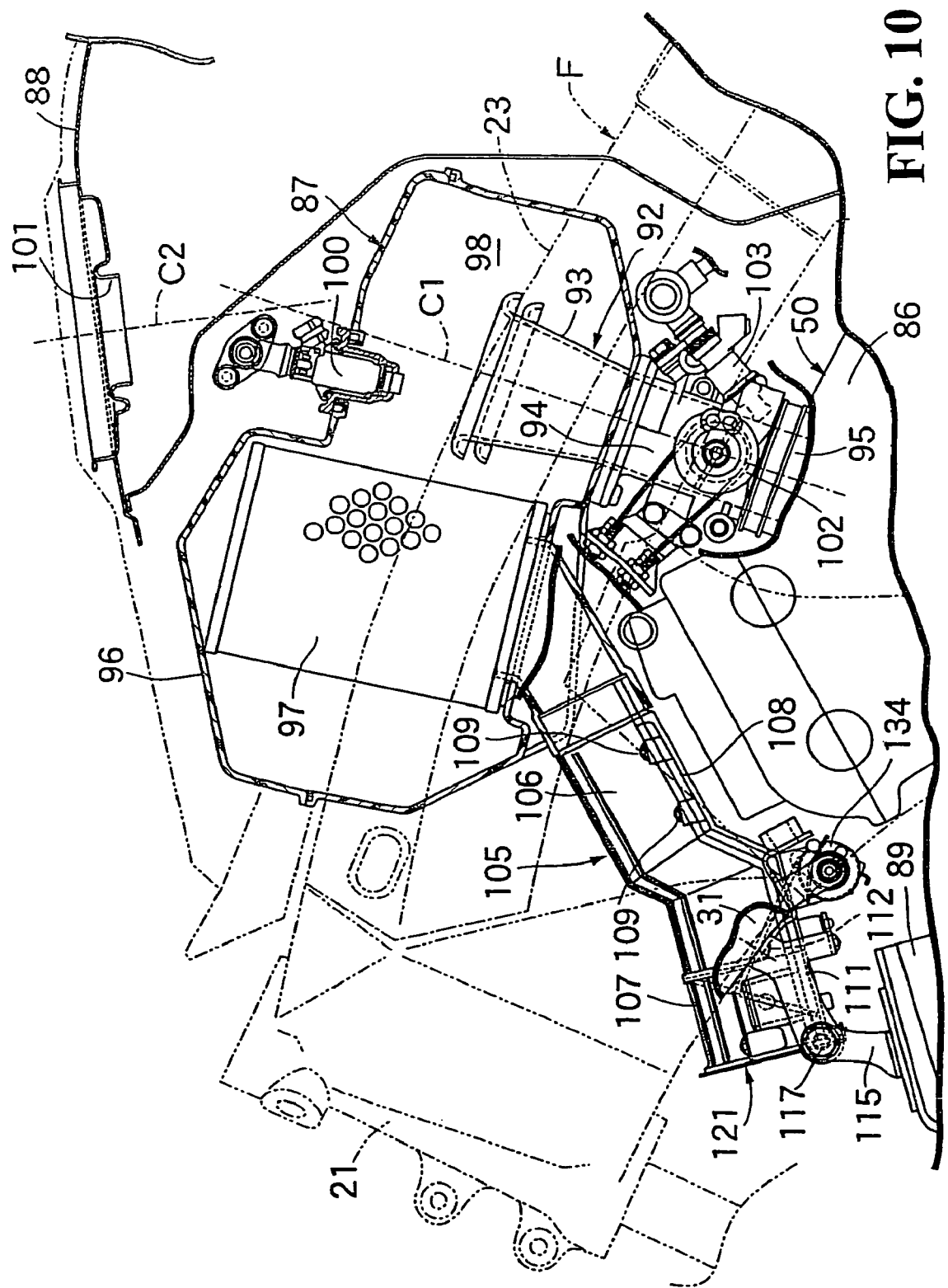
FIG. 10 is a sectional view taken along line 10—10 in FIG. 6.
Figure 11:
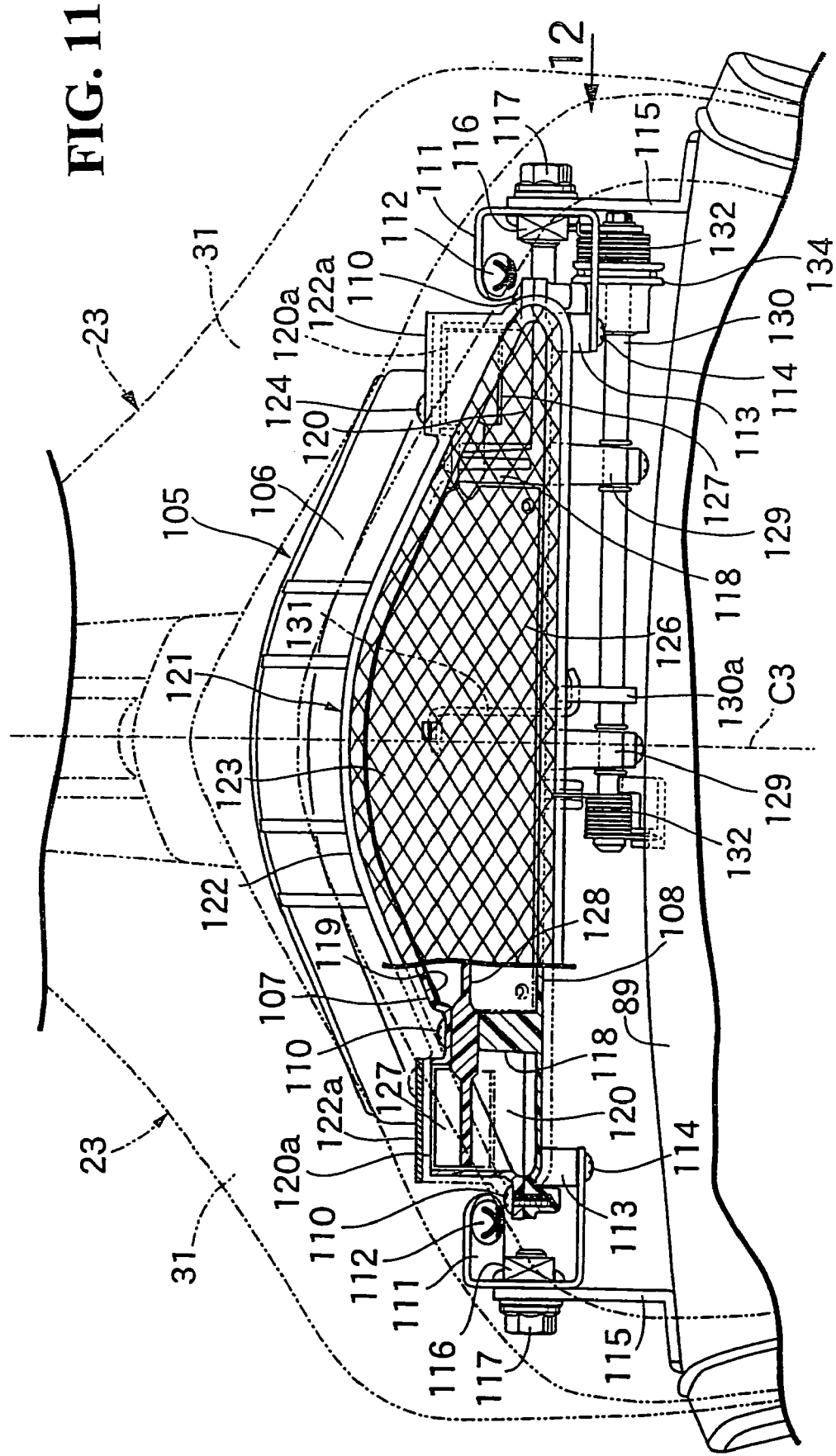
FIG. 11 is an enlarged view of a part in FIG. 6.
Figure 12:
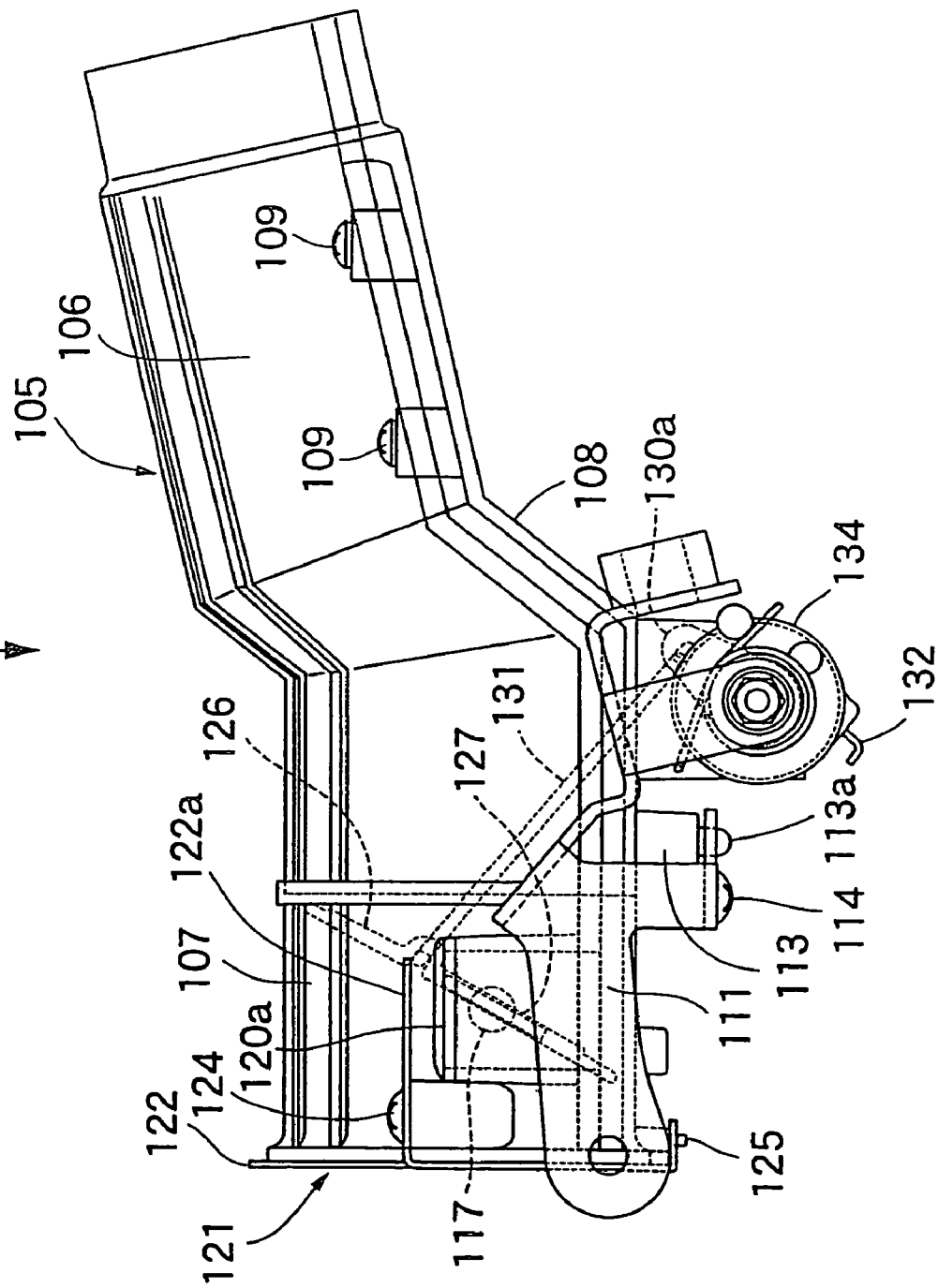
FIG. 12 is an enlarged view in the direction of an arrow 12 in FIG. 11.
Figure 13:
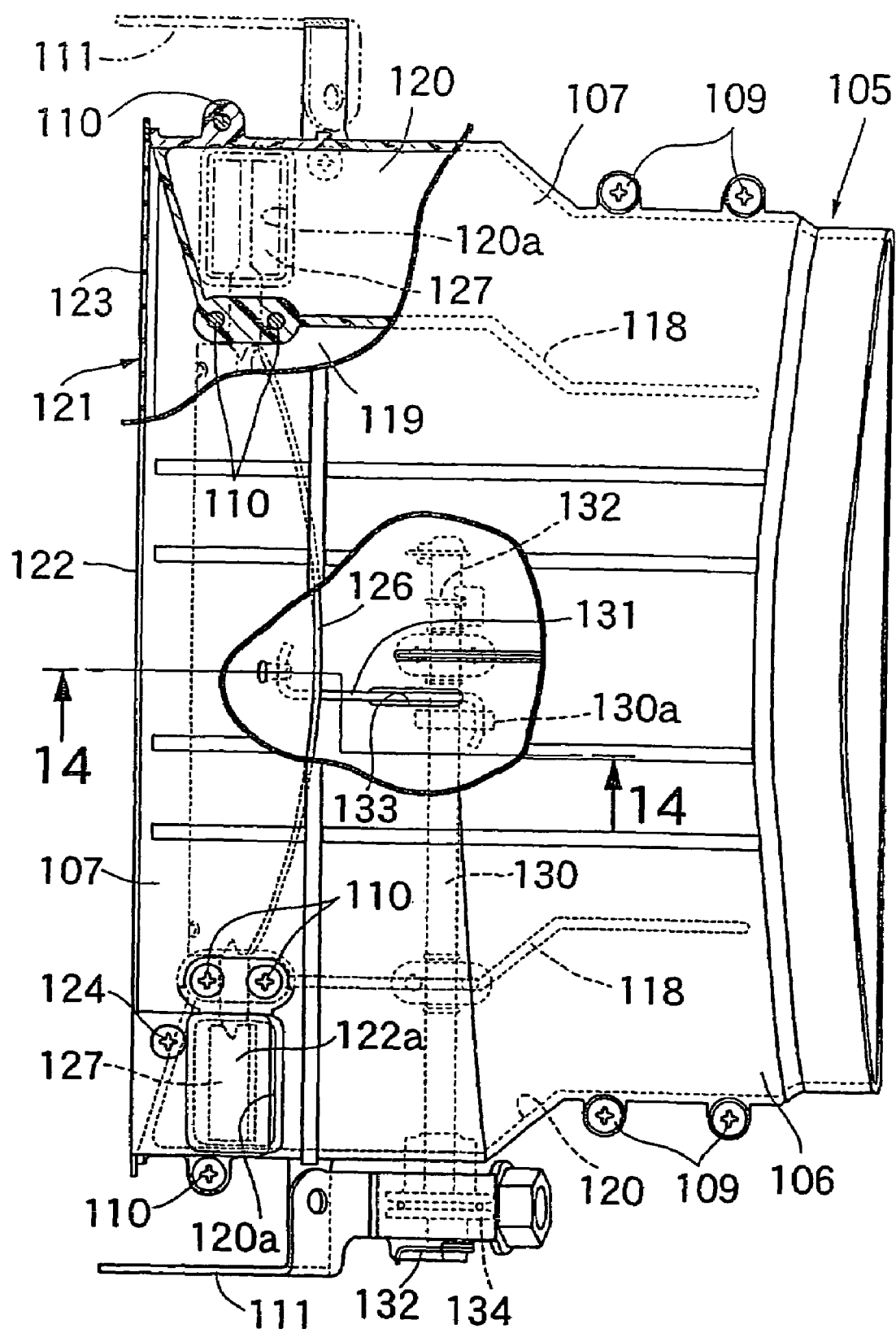
FIG. 13 is a transverse sectional plan view partly cut away as viewed in a direction indicated by an arrow 13 in FIG. 12.

Referring also to FIG. 10, an air cleaner 87 for purifying the air to be supplied into the engine E is disposed above a cylinder head 86 of the engine body 50 such that it is positioned rearwardly of the head pipe 22 of the vehicle body frame F. A fuel tank 88 is carried on the main frames 23, of the vehicle body frame F such that it covers a rear portion and an upper portion of the air cleaner 87. A radiator 89 is disposed forwardly of the engine body 50. As shown in FIG. 2, a main seat 90 for allowing a rider to sit thereon is supported on the seat rails 30 rearwardly of the fuel tank 88. A pillion seat 91 for allowing a passenger to sit thereon is supported on the seat rails 30 at a position spaced rearwardly from the main seat 90.

Intake air path portions 92 are provided in a side wall of an upper portion of the cylinder head 86 and extend linearly such that they introduce purified air from the air cleaner 87 above the cylinder head 86. The intake air path portions 92 are individually connected to the cylinders. Each of the intake air path portions 92 includes a funnel 93 having an open end portion projecting into the air cleaner 87, and a throttle body 94 connected to a lower end of the funnel 93. The throttle body 94 is connected to a side wall of an upper portion of the cylinder head 86 through an insulator 95.

The air cleaner 87 includes a cylindrical cleaner element 97 fixedly accommodated in a cleaner case 96. A purification chamber 98 is formed around the cleaner element 97 in the cleaner case 96, and air purified as it passes through the cleaner element 97 is introduced into the purification chamber 98. The funnels 93 at the upstream ends of the intake air path portions 92 are respectively attached in parallel to each other to the cleaner case 96 such that they are open to the purification chamber 98.

Incidentally, a first injector 100 for injecting fuel when the engine E rotates at a high speed is attached to the cleaner case 96 of the air cleaner 87 for each of the cylinders of the engine E. The first injectors 100 are attached to the cleaner case 96 such that they are disposed forwardly of the center lines C1 of the intake air path portions 92 and have axial lines inclined with respect to the center lines C1. In addition, a fuel pump (not shown) is built in the fuel tank 88. Fuel is supplied from the fuel pump into the first injectors 100.

An oil filler 101 is provided at a front portion of the fuel tank 88. The first injectors 100 are attached to the cleaner case 96 such that they are disposed forwardly of a center line C2 of the oil filler 101. On a projected plane on a plane parallel to the center line C2 of the oil filler 101 and the center lines C1 of the intake air path portions 92, upper portions of the first injectors 100 are disposed forwardly of an intersecting point P of the center lines C1 and C2.

The throttle bodies 94 of the intake air path portions 92 individually have throttle valves (not shown) built therein for controlling the intake amounts of air to flow in the intake air path portions 92. A throttle drum 102 connected to the throttle valves is disposed sidewardly of the throttle body 94.

In addition, second injectors 103 are attached to rear side portions of the throttle bodies 94 at positions nearer to the engine E than the throttle valves. Each of the second injectors 103 receives a supply of fuel from the fuel pump in the fuel tank 88 and injects the fuel.

Referring also to FIGS. 11 to 14, an intake duct 105 for introducing external air into the air cleaner 87 is disposed below the head pipe 22 provided at the front end of the vehicle body frame F and extends forwardly from the air cleaner 87. A rear end portion of the intake duct 105 projects into and is secured to a lower portion of the cleaner case 96 such that it introduces external air into the cleaner element 97 in the air cleaner 87.

The intake duct 105 includes a rear duct main body 106, a front duct main body 107, and a lower lid plate 108 and is formed such that, in a side elevation, a rear portion thereof is inclined rearwardly upwards. The rear duct main body 106 is swollen upwardly at a central portion thereof in the widthwise direction and has a substantially triangular cross sectional shape which is open at the bottom thereof. The front duct main body 107 has a cross sectional shape substantially the same as that of the rear duct main body 106 and is joined to a front portion of the rear duct main body 106. The lower lid plate 108 closes the lower open ends of the front and rear duct main bodies 106 and 107. The lower lid plate 108 is fastened to the rear duct main body 106 by a plurality of screw members 109 and is fastened to the front duct main body 107 by a plurality of screw members 110.

Supporting stays 111, 111 are secured by screw members 112 to lower faces of front portions of the pipe members 31, 31 which form part of the main frames 23, 23 of the vehicle body frame F. Attaching bosses 113, 113 provided at lower portions of the opposite sides of a front portion of the intake duct 105 are fastened to the supporting stays 111, 111 by screw members 114, 114 thereby to support the front portion of the intake duct 105 on the vehicle body frame F. In addition, positioning pins 113a are provided in a projecting manner on the attaching bosses 113 and are fitted in the supporting stays 111.

The radiator 89 is disposed below the intake duct 105, and stays 115, 115 extend upwardly from the opposite sides of the radiator 89. Weld nuts 116, 116 are fixed to the supporting stays 111, 111. Thus, bolts 117, 117 fitted in the stays 115, 115 and the supporting stays 111, 111 are screwed into the weld nuts 116, 116 and tightened to support the supporting 89 on the vehicle body frame F.

A pair of partition walls 118, 118 are provided integrally on the lower lid plate 108 of the intake duct 105 and contact with lower faces of upper portion of the front and rear duct main bodies 106 and 107. A first intake path 119 and a pair of left and right second intake paths 120, 120 are formed in the intake duct 105. The first intake path 119 has a central portion in the widthwise direction disposed on a center line C3 in the widthwise direction of the front wheel WF. The second intake paths 120, 120 are disposed on the opposite sides of the first intake path 119. The first intake path 119 and the second intake paths 120, 120 are partitioned by the partition walls 118, 118 such that the flow area of the first intake path 119 is set greater than the total flow area of the pair of second intake paths 120, 120.

In addition, front portions of the partition walls 118, 118 are formed in such a shape that they are spaced away from each other forwardly. Front end portions of the partition walls 118, 118 contact with the inner faces of the opposite side walls of the front duct main body 107. A front portion of the first intake path 119 is open forwardly at the front end of the intake duct 105 such that it occupies the entire front end opening of the intake duct 105. The front end openings 120a of the second intake paths 120, 120 are formed at a front end portion of the intake duct 105 such that they are open in a direction different from the direction of the front end opening of the first intake path 119. In the present working example, the front end openings 120a, 120a are formed in the front duct main body 107 such that they are open upwardly on the opposite left and right sides of a front end portion of the first intake path 119.

A front end portion of the intake duct 105 is formed in a substantially triangular shape such that it has an upper edge extending along lower end edges of the joining portions of the head pipe 22 and the main frames 23, 23 as viewed from the front and has a lower edge portion extending along an upper portion of the radiator 89. A grill 121 is mounted at a front end portion of the intake duct 105.

The grill 121 includes a frame member 122 having a shape corresponding to the front end opening edge of the intake duct 105 and a net-like member 123 having a peripheral edge portion supported on the frame member 122. A pair of baffles 122a, 122a are provided integrally on the frame member 122 and disposed at positions spaced from the front end openings 120a in such a manner as to form gaps from the front end openings 120a of the second intake paths 120, 120. The baffles 122a, 122a are fastened to the opposite sides of a front portion of the front duct main body 107 of the intake duct 105 by screw members 124, 124. Furthermore, positioning pins 125 are provided in a projecting manner at a front end of the lower lid plate 108 such that they are fitted in a lower portion of the frame member 122. The positioning pins 125 are provided to prevent a lower portion of the frame member 122 from being removed from the front end portion of the intake duct 105.

A first intake control valve 126 of the butterfly type is disposed in the first intake path 119. The first intake control valve 126 is controlled to be opened or closed in response to the speed of rotation of the engine E such that, upon low speed rotation of the engine E, the first intake control valve 126 closes the first intake path 119. However, upon high speed rotation of the engine E, the first intake control valve 126 opens the first intake path 119. Furthermore, second intake control valves 127 of the butterfly type are disposed in the second intake paths 120. The second intake control valves 127 are controlled to be opened or closed in response to the speed of rotation of the engine E such that, upon low speed rotation, the second intake control valves 127 open the second intake paths 120. However, upon high speed rotation of the engine E, the second intake control valves 127 close the second intake paths 120. The first intake control valve 126 and the second intake control valves 127 are secured commonly to a valve shaft 128 which is supported for rotation on the intake duct 105 and has an axial line perpendicular to the flowing direction of air which flows in the first intake path 119.

The valve shaft 128 is supported for rotation by the partition walls 118, 118 at a portion of the intake duct 105 corresponding to the front end openings 120a of the second intake paths 120. Two pairs of screw members 110, 110 from among the plurality of screw members 110 for fastening the front duct main body 107 to the lower lid plate 108 are screwed in the partition walls 118, 118 at positions at which they sandwich the valve shaft 128 from the opposite sides.

Figure 14:
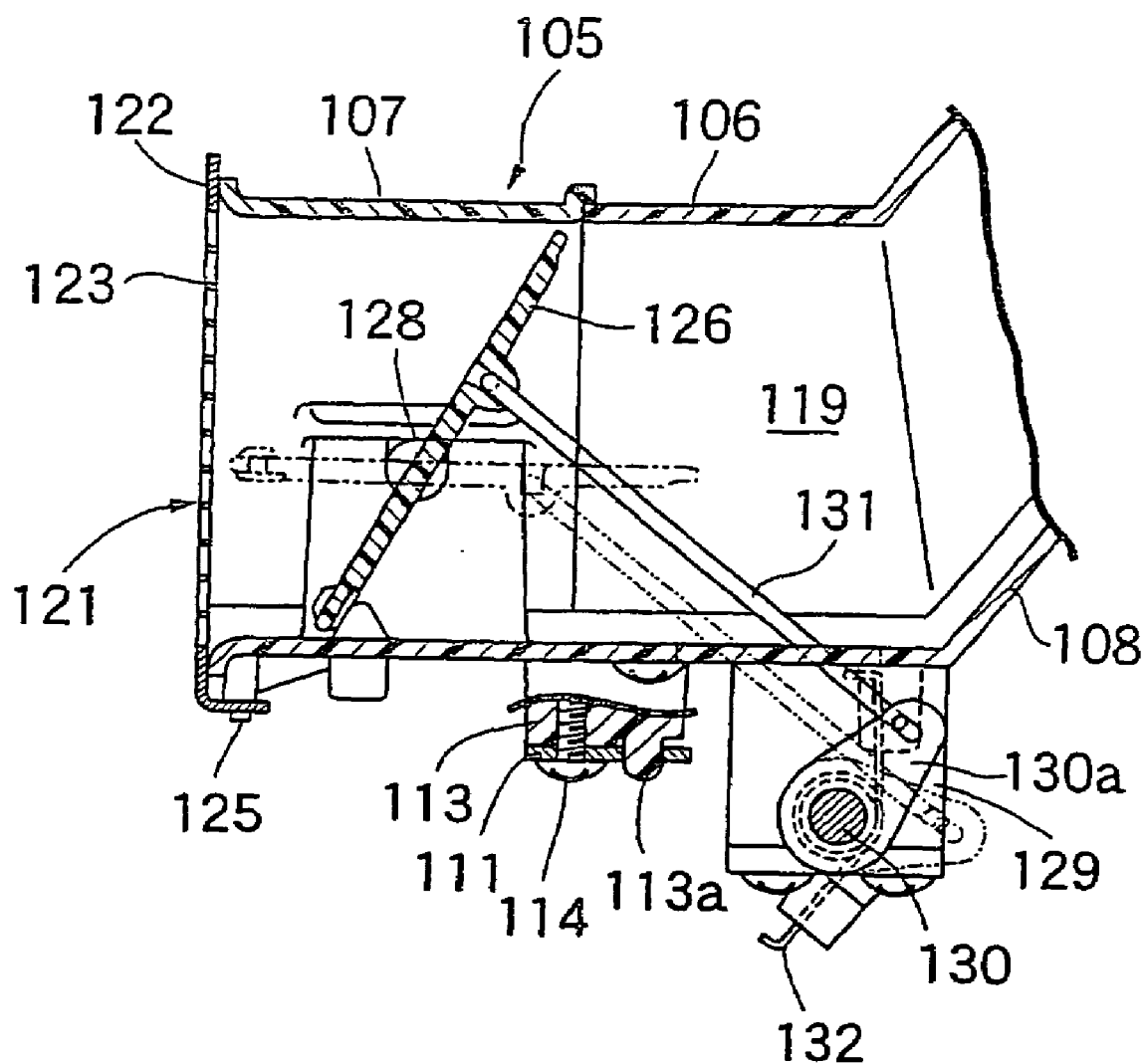
FIG. 14 is a sectional view taken along line 14—14 in FIG. 13.

The first intake control valve 126 for varying the flow area of the first intake path 119 is secured to the valve shaft 128 such that it has a rearwardly upwardly inclined posture where the first intake path 119 is in a closed state as shown in FIG. 14. In addition, the first intake control valve 126 is formed such that, when it is in the closed state, the area of a portion above the valve shaft 128 is greater than the area at another portion below the valve shaft 128. Furthermore, when the first intake control valve 126 is in its open state, it assumes a substantially horizontal position as indicated by a chain line in FIG. 14 so that the resistance thereof to the air flowing in the first intake path 119 may be minimized.

The second intake control valves 127 for varying the flow areas of the second intake paths 120 are secured to the valve shaft 128 such that, when the first intake control valve 126 is in the state wherein it closes the first intake path 119, they open the front end openings 120a of the second intake paths 120.

A pivot shaft 130 is disposed rearwardly of the valve shaft 128 below the intake duct 105 and extends in parallel to the valve shaft 128. The pivot shaft 130 is supported for rotation by a plurality of bearing portions 129 provided in a projecting manner on a lower face of the intake duct 105, that is, on a lower face of the lower lid plate 108.

An arm 130a is provided at a portion of the pivot shaft 130 corresponding to the first intake path 119. A connecting rod 131 is connected at one end thereof to a portion of the first intake control valve 126 in its closed state higher than the valve shaft 128 and connected at the other end thereof to the arm 130a. The connecting rod 131 extends through a lower portion of the intake duct 105, that is, through the lower lid plate 108. Accordingly, in response to rotation of the pivot shaft 130, the first intake control valve 126 is turned between a closed position indicated by a solid line in FIG. 14 and an open position indicated by a chain line in FIG. 14.

In addition, return springs 132, 132 are provided between the opposite end portions of the pivot shaft 130 and the intake duct 105 and bias the pivot shaft 130 and the valve shaft 128 to turn in a direction in which the first intake control valve 126 is moved to the closed position. The connecting rod 131 extends for movement through a through-hole 133 provided in the lower lid plate 108. The through-hole 133 is formed long in the forward and backward direction corresponding to forward and backward movements of the position at which the connecting rod 131 extends through the lower lid plate 108 in response to pivotal motion of the arm 130a together with the pivot shaft 130.

A driven pulley 134 is secured to one end of the pivot shaft 130. An actuator 141 is supported on one of the supporting plate portions 33 provided at rear portions of the main frames 23 and disposed on the left side of an upper portion of the engine body 50. A turning force is transmitted from the actuator 141 to the driven pulley 134 through a first power transmitting wire 135.

Figure 15:
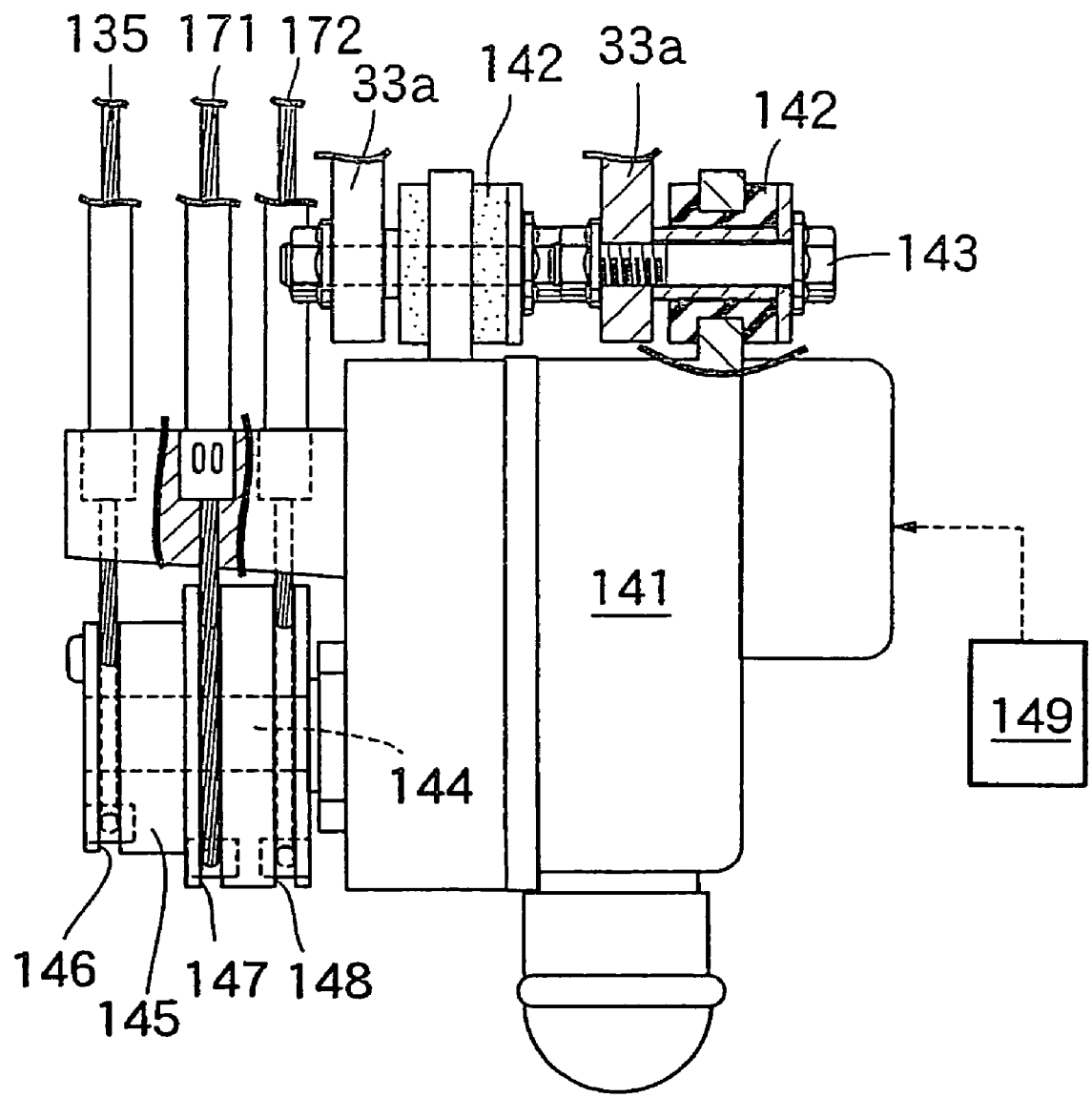
FIG. 15 is an enlarged view in the direction indicated by an arrow 15 in FIG. 2.

Referring to FIG. 15, the actuator 141 includes a reversibly rotatable electric motor and a speed reduction mechanism for reducing the speed of output power of the electric motor. The actuator 141 is attached to a pair of brackets 33a, 33a provided on one of the supporting plate portions 33 of the vehicle body frame F by means of bolt 143 with resilient members 142, 142 interposed therebetween. A driving pulley 145 is securely mounted on an output power shaft 144 of the actuator 141. A first wire groove 146 of small diameter and second and third wire grooves 147 and 148 of large diameter are provided on the driving pulley 145.

The first power transmitting wire 135 is wrapped and engaged at an end portion thereof around and with the first wire groove 146 and is provided to transmit rotational force to the driven pulley 134 of the intake duct 105 side.

An electronic control unit 149 is connected to the actuator 141. The electronic control unit 149 controls operation of the actuator 141 in response the speed of rotation of the engine inputted from a sensor (not shown).

Referring back to FIGS. 1 and 2, an exhaust system 150 connected to the engine E includes individual exhaust pipes 151, 151, a pair of first collecting exhaust pipes 152, 152, a single second collecting exhaust pipe 153, and a second exhaust muffler 155. The individual exhaust pipes 151, 151 are individually connected to a lower portion of a front side wall of the cylinder head 86 of the engine body 50. Each of the first collecting exhaust pipes 152 connects a pair of individual exhaust pipes 151, 151 commonly. The second collecting exhaust pipe 153 has a pair of first collecting exhaust pipes 152 connected commonly thereto and has a first exhaust muffler 154 interposed in an intermediate portion thereof. The second exhaust muffler 155 is connected to a downward end of the second collecting exhaust pipe 153.

The individual exhaust pipes 151, 151 individually extend downwardly from a front portion of the engine body 50 while the first collecting exhaust pipes 152 are disposed such that they extend substantially in the forward and backward directions below the engine body 50. The second collecting exhaust pipe 153 is curved and rises such that it is directed to the right side of the vehicle body from below the engine body 50 between the rear wheel WR and the engine body 50 and further extends rearwardly above the rear wheel WR. The first exhaust muffler 154 is interposed in the rising portion of the second collecting exhaust pipe 153. A rear end exhaust portion of the exhaust system 150, that is, a downward end portion of the second exhaust muffler 155, is disposed higher than the axle 68 of the rear wheel WR.

Figure 16:
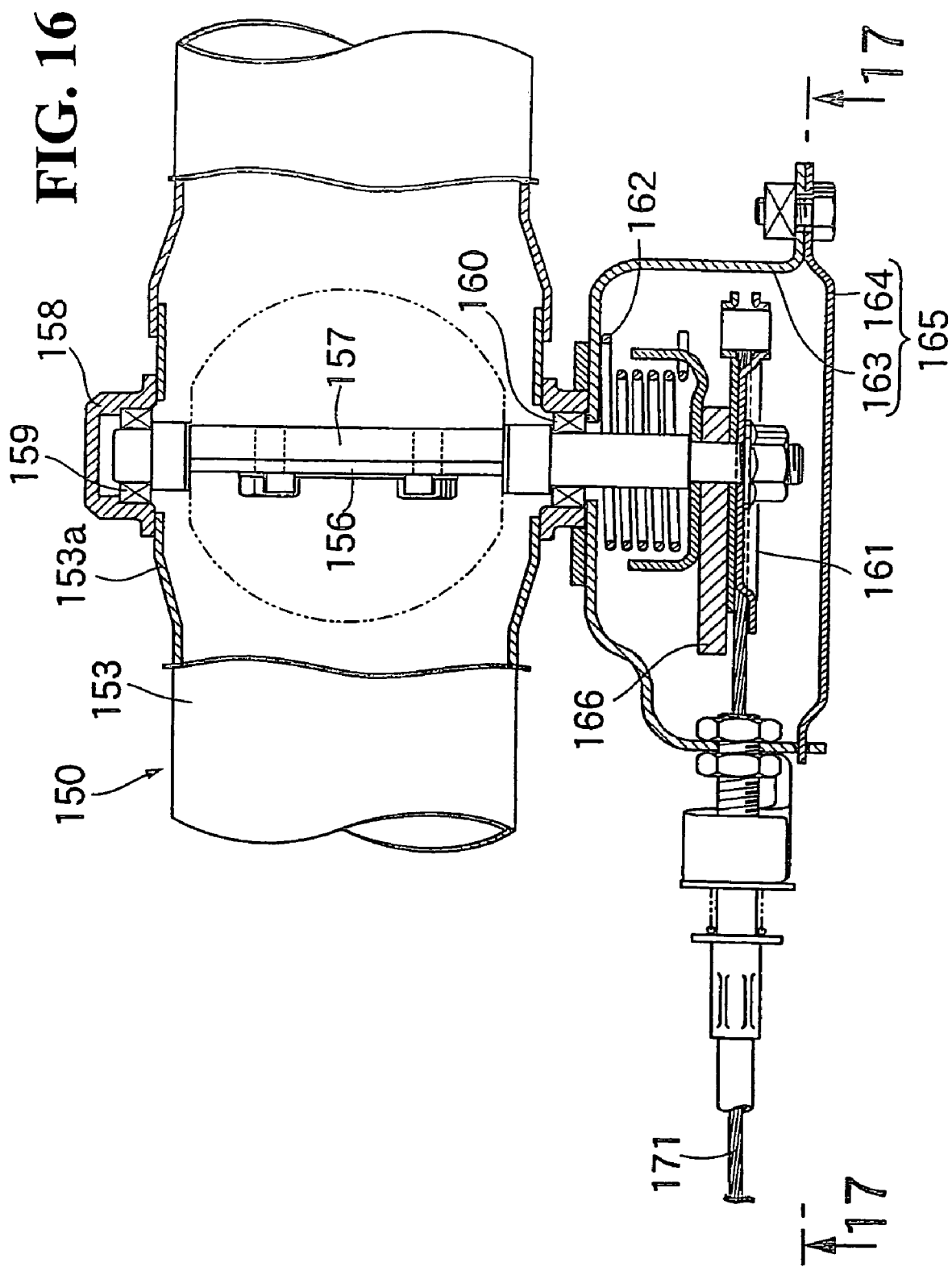
FIG. 16 is an enlarges sectional view taken along line 16—16 in FIG. 2.
Figure 17:
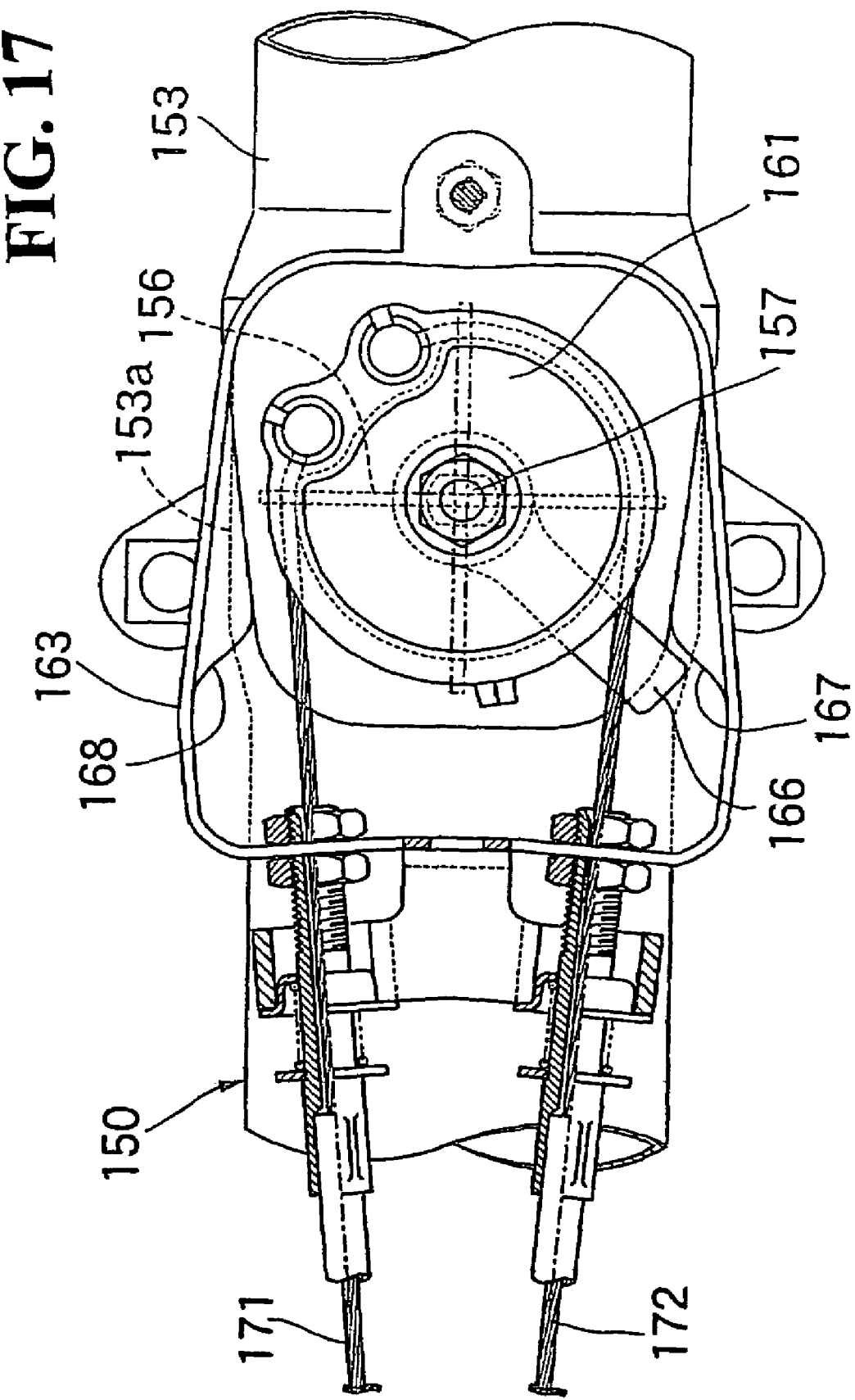
FIG. 17 is a sectional view taken along line 17—17 in FIG. 16.

Referring also to FIGS. 16 and 17, an increased diameter portion 153a is provided at a portion of the second collecting exhaust pipe 153 forming part of the exhaust system 150, which is positioned forwardly and upwardly of the axle 68 of the rear wheel WR. An exhaust control valve 156 is disposed in the increased diameter portion 153a for varying the flow area in the second collecting exhaust pipe 153 in response to the speed of rotation of the engine E to control the exhaust gas pulsation in the exhaust system 150.

In a low or medium speed rotational region of the engine E, the exhaust control valve 156 is operated to the closing side in order to utilize an exhaust gas pulsation effect in the exhaust system 150 to raise the output power of the engine E. However, in a high speed rotational region of the engine E, the exhaust control valve 156 is operated to the opening side in order to reduce the exhaust gas flow resistance in the exhaust system 150 to raise the output power of the engine E. The exhaust control valve 156 is secured to a valve shaft 157 supported for rotation on the increased diameter portion 153a of the second collecting exhaust pipe 153.

A hearing housing 158 of a bottomed cylindrical shape is securely mounted on the increased diameter portion 153a, and the valve shaft 157 is supported at one end thereof on the bearing housing 158 through a seal member 159. The other end portion of the valve shaft 157 projects from the increased diameter portion 153a with a seal member 160 interposed between the increased diameter portion 153a and the valve shaft 157. A driven pulley 161 is secured to the projecting end of the valve shaft 157. A return spring 162 is provided between the valve shaft 157 and the increased diameter portion 153a for biasing the valve shaft 157 to open the exhaust control valve 156.

Incidentally, the projecting portion of the valve shaft 157 of the increased diameter portion 153*a*, the driven pulley 161 and the return spring 162 are accommodated in a case 165 which includes a cup-shaped case main body 163 secured to the increased diameter portion 153*a* and a lid plate 164 fastened to the case main body 163 in such a manner as to close up an open end of the case main body 163.

A control arm 166 is secured to the valve shaft 157 within the case 165 and projects at an end portion thereof farther than the outer periphery of the driven pulley 161. A closing side stopper 167 and an opening side stopper 168 are provided on an inner face of the case main body 163 of the case 165. The closing side stopper 167 receives an end portion of the control arm 166 to restrict the end of pivotal motion of the valve shaft 157, that is, the exhaust control valve 156, to the closing side. The opening side stopper 168 receives an end portion of the control arm 166 to restrict the end of pivotal motion of the valve shaft 157, that is, the exhaust control valve 156, to the opening side.

A second power transmitting wire 171 is wrapped and engaged at one end portion thereof around and with the driven pulley 161 for operating, when the second power transmitting wire 171 is pulled, the exhaust control valve 156 to the closing side. Furthermore, a third power transmitting wire 172 is wrapped and engaged at one end portion thereof around and with the driven pulley 161 for operating, when the third power transmitting wire 172 is pulled, the exhaust control valve 156 in the opening side. The second power transmitting wire 171 is wrapped and engaged at the other end portion thereof around and with the second wire groove 147 of the driving pulley 145 of the actuator 141 in the direction opposite to the wrapping direction of the first power transmitting wire 135 as seen in FIG. 15. The third power transmitting wire 172 is wrapped and engaged at the other end portion thereof around and with the third wire groove 148 of the driving pulley 145 in the same direction as the wrapping direction of the first power transmitting wire 135 as seen in FIG. 15.

In short, the actuator 141 for driving the exhaust control valve 156 which is controlled in response to the speed of rotation of the engine E is connected to the first intake control valve 126 to drive the first intake control valve 126 of the intake duct 105 to rotate.

Incidentally, the increased diameter portion 153*a* of the second collecting exhaust pipe 153 in which the exhaust control valve 156 is disposed is preferably disposed below the main seat 90 in order to prevent the second and third power transmitting wires 171 and 172 to the utmost from being acted upon by undesirable external force. Furthermore, the case 165 is disposed such that it is exposed to the outside as viewed in a side elevation in order to cause the case 165 to be exposed readily to running wind.

The actuator 141 is preferably disposed rearwardly upwardly of the engine body 50 at a position at which the distance thereof to the valve shaft 128 of the intake duct 105 and the distance thereof to the valve shaft 157 of the exhaust control valve 156 are substantially equal to each other. With this arrangement, obstacles which may be interposed between the driven pulley 161 of the exhaust control valve 156 and the actuator 141 can be reduced thereby to facilitate layout of the second and third power transmitting wires 171 and 172 which interconnect the driven pulley 161 and the actuator 141.

Figure 18:
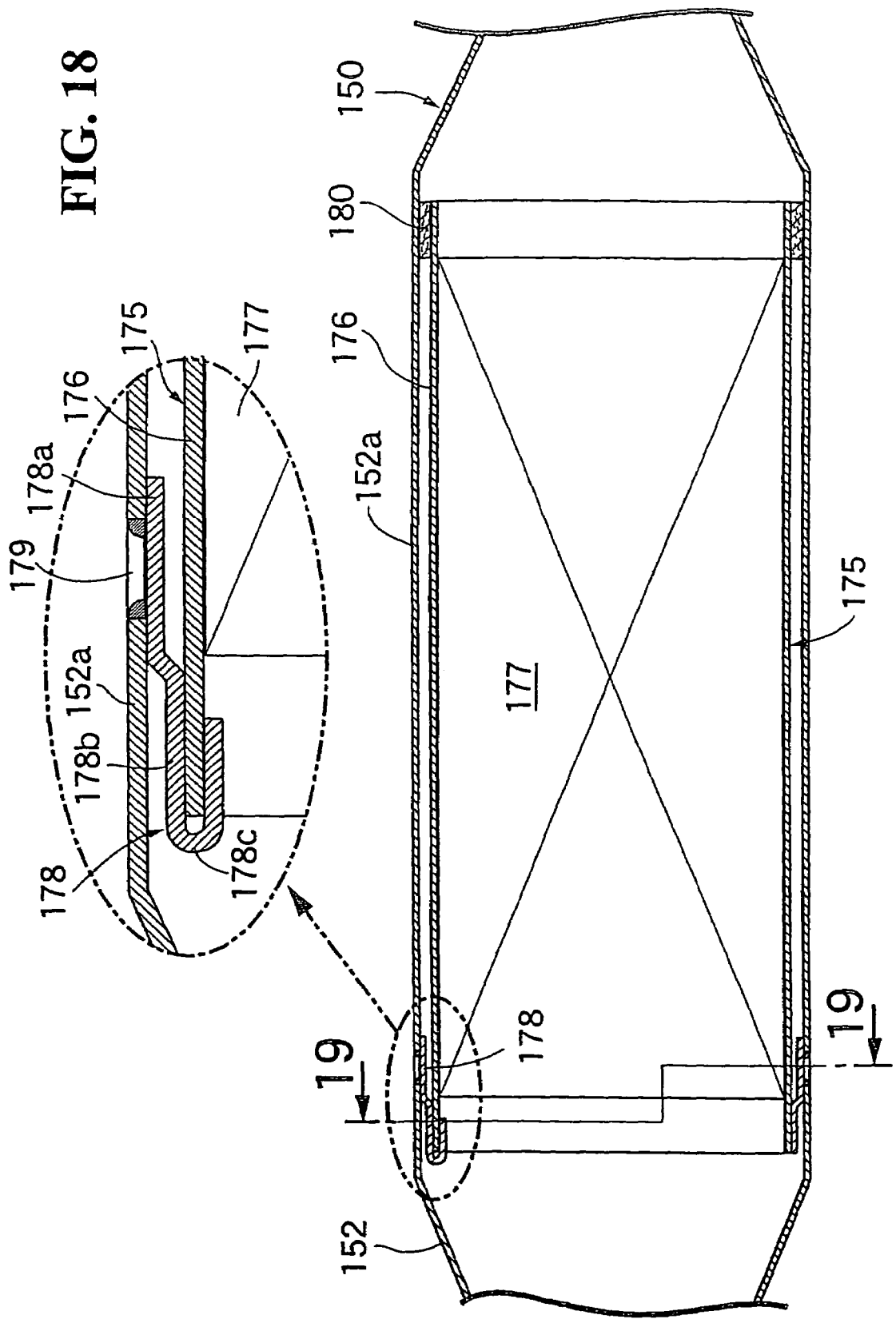
FIG. 18 is a sectional view taken along line 18—18 in FIG. 2.
Figure 19:
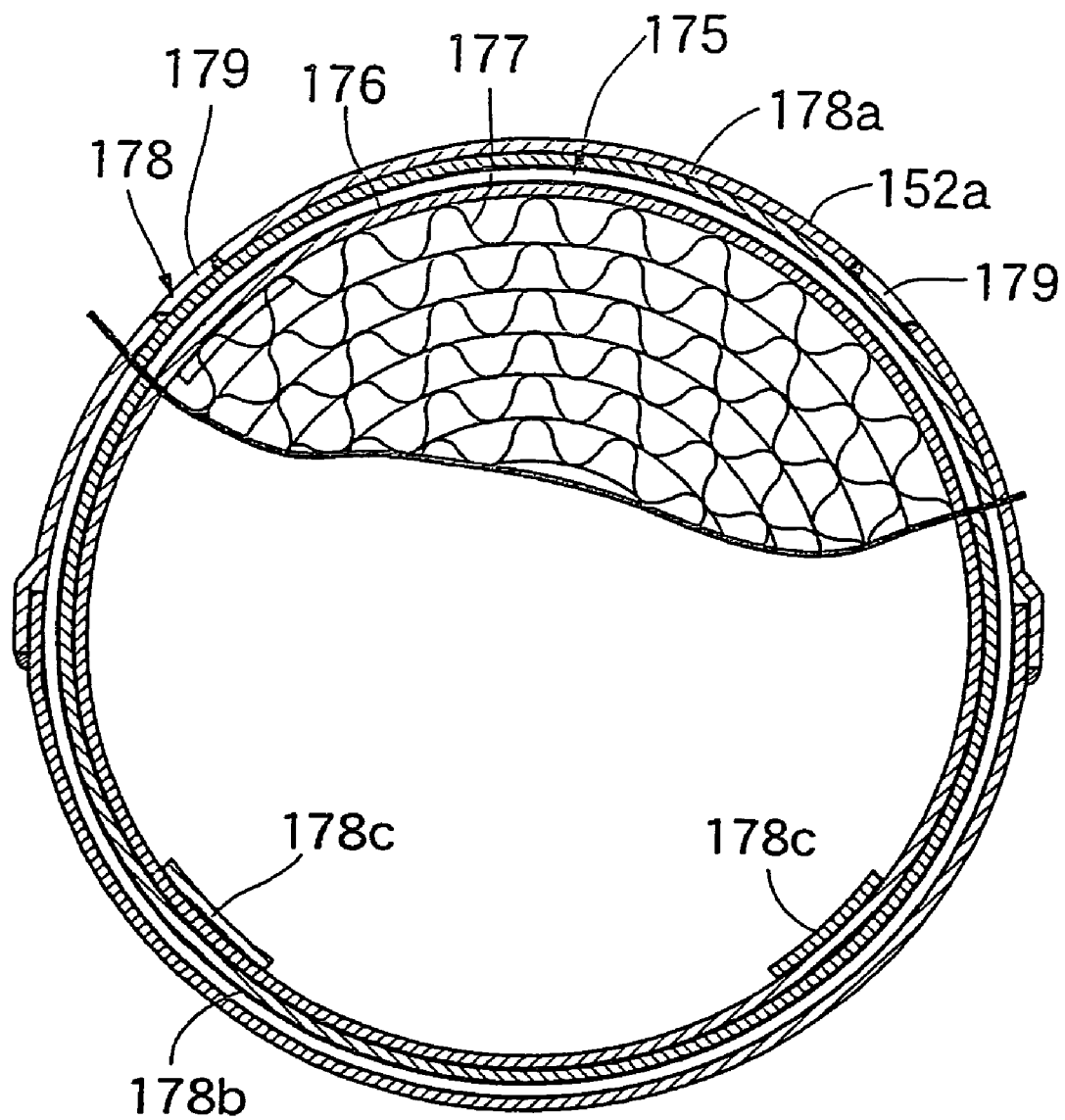
FIG. 19 is a sectional view taken along line 19—19 in FIG. 18.

Referring to FIGS. 18 and 19, increased diameter portions 152*a* are provided at portions of the first collecting exhaust pipes 152 forming part of the exhaust system 150 which are positioned below the engine body 50. A catalyst member 175 is accommodated in the increased diameter portions 152*a*. Where the catalyst member 175 is disposed below the engine body 50 in this manner, exhaust gas exhausted from the cylinder head 86 can flow through the catalyst member 175 while it keeps a comparatively high temperature.

The catalyst member 175 includes a cylindrical case 176 and a catalyst carrier 177 formed in a cylindrical shape so as to allow flow of exhaust gas therethrough and accommodated in the case 176 such that one end thereof is disposed inwardly of one end of the case 176. The case 176 is formed from a material different from that of the first collecting exhaust pipe 152. For example, while the first collecting exhaust pipe 152 is made of titanium, the case 176 and the catalyst carrier 177 of the catalyst member 175 are made of stainless steel.

A bracket 178 made of the same material as that of the first collecting exhaust pipe 152 such as titanium is welded to an inner circumferential face of the increased diameter portion 152*a* of the first collecting exhaust pipe 152. The bracket 178 has a large ring portion 178*a*, a small ring portion 178*b*, and extending arm portions 178*c*, 178*c* provided integrally thereon. The large ring portion 178*a* is fitted in the increased diameter portion 152*a* and surrounds one end portion of the case 176. The small ring portion 178*b* connects to the large ring portion 178*a* such that it fits one end of the case 176 therein. The extending arm portions 178*c*, 178*c* extend in the opposite side to the large ring portion 178*a* from a plurality of locations of the small ring portion 178*b*, for example, four locations spaced at equal distances in a circumferential direction.

Several perforations 179 are provided at different positions of the increased diameter portions 152*a* in the circumferential direction in an opposing relationship to the outer circumferential face of the large ring portion 178*a*. The large ring portion 178*a* is welded to the increased diameter portion 152*a* at the perforations 179 thereby to weld the bracket 178 to the increased diameter portion 152*a* of the first collecting exhaust pipe 152. Furthermore, the extending arm portions 178*c*, 178*c* are coupled by caulking to one end of the case 176 of the catalyst carrier 177. The bracket 178 welded to the increased diameter portion 152*a* of the first collecting exhaust pipe 152 is coupled by caulking to one end of the case 176 at a portion projecting from the one end of the catalyst carrier 177.

A ring 180 formed from a stainless steel mesh is securely mounted on an outer face of the other end of the case 176 of the catalyst member 175 by spot welding. Since the ring 180 is interposed between the increased diameter portion 152*a* of the first collecting exhaust pipes 152 and the other end portion of the case 176, the other end side of the catalyst member 175 whose one end side is secured to the increased diameter portion 152*a* through the bracket 178 can slide upon thermal expansion. Consequently, stress caused by thermal expansion of the catalyst member 175 can be prevented from acting between the one end portion of the catalyst member 175 and the increased diameter portion 152*a*.

Referring back again to FIG. 1, the front of the head pipe 22 is covered with a front cowl 181 made of a synthetic resin material. The opposite sides of a front portion of the vehicle body are covered with a center cowl 182 made of a synthetic resin material and connecting to the front cowl 181. A lower cowl 183 made of a synthetic resin is formed contiguously to the center cowl 182 and covers the engine body 50 from the opposite sides. Furthermore, rear portions of the seat rails 30 are covered with a rear cowl 184.

A front fender 185 is attached to the front fork 21 and covers the top of the front wheel WF. A rear fender 186 is attached to the seat rails 30 and covers the top of the rear wheel WR.

The operation of the present working example will now be described. While the first cross pipe 27 extends between the front portions of the pair of left and right main frames 23, 23 provided contiguously to the head pipe 22 at the front end of the vehicle body frame F, the mounting holes 32 are provided coaxially in the inner side walls of the front portions of the main frames 23, 23. The opposite end portions of the first cross pipe 27 fitted in the mounting holes 32 are welded to the inner side walls of the main frames 23, 23. Accordingly, by varying the fitting amounts of the opposite end portions of the first cross pipe 27 in the mounting holes 32, a dimension error between the pair of left and right main frames 23, 23 and an error of the length of the first cross pipe 27 in the axial direction can be absorbed. Consequently, the opposite end portions of the first cross pipe 27 can be welded with certainty to the inner side walls of the main frames 23, 23.

The head pipe 22 includes the cylindrical portion 22a for supporting the front fork 21 for steering the motorcycle and the pair of left and right gussets 22b, 22b formed integrally with and extending rearwardly downwards from the cylindrical portion 22a. The main frames 23 at least include the gussets 22b, 22b and the pipe members 31 individually welded to the gussets 22b, 22b. The extensions 22c are formed integrally on the gussets 22b such that they form an inner side wall of a front portion of the main frame 23, and extend rearwardly such that they are disposed inwardly of the inner side walls of the front portions of the pipe members 31. In addition, the mounting holes 32 are formed in the extensions 22c, and the opposite end portions of the first cross pipe 27 are fitted in the mounting holes 32 such that the opposite ends thereof are opposed to the inner side walls of the front portions of the pipe members 31. The opposite end portions of the first cross pipe 27 are welded to the outer faces of the extensions 22c. In other words, since the opposite end portions of the first cross pipe 27 are welded the outer faces of the extensions 22c integral with the gussets 22b which form part of the main frames 23, welding of the first cross pipe 27 to the main frames 23 is facilitated. In addition, since the welded portions cannot be observed from the outside, the appearance is improved.

The pipe member 31 is formed in a shape of an angular tube elongated upwardly and downwardly and having the inner side wall 31a which is flat over the substantially overall length in the upward and downward direction and the outer side face 31b which extends substantially along the inner side wall 31a and is bent in the plane PL perpendicular to the inner side walls 31a. Therefore, the bending work of the pipe member 31 is easy.

In addition, since the pipe members 31, 31 are inclined so as to approach each other upwardly and joined to the gussets 22b, 22b of the head pipe 22, by the simple structure that only the pipe members 31, 31 are inclined, the space between lower portions of the pipe members 31, 31 can be increased to sufficiently assure the arrangement space for the engine E and the space between upper portions of the pipe members 31, 31 can be reduced to make it less liable for the knees of the rider to interfere with the pipe members 31, 31.

In order to support the engine body 50 at upper portions and lower portions of the pivot plates 26, 26 of the vehicle body frame F, the insertion hole 53 for receiving the mount bolt 52 and the first arresting portion 54 which surrounds the outer end of the insertion hole 53 so as to engage with the increased diameter head portion 52a at the one end of the mount bolt 52 are provided on one of the pivot plates 26 while the threaded hole 57 coaxial with the insertion hole 53 and the second arresting portion 58 surrounding the outer end of the threaded hole 57 are provided on the other one of the pivot plates 26. Furthermore, the cylindrical bolt 60 is screwed in the threaded hole 57 such that the engine body 50 is sandwiched between the one end of the cylindrical bolt 60 and the inner side face of the one pivot plates 26 and the other end of the cylindrical bolt 60 is positioned inwardly of the second arresting portion 58. Furthermore, the nut 63 is screwed on the other end portion of the mount bolt 52 which is fitted in the insertion hole 53, engine body 50, cylindrical bolt 60 and threaded hole 57 and projects from the threaded hole 57 such that it can engage with the second arresting portion 58.

According to the supporting structure for the engine body 50 on the vehicle body frame F described above, by adjusting the screwed position of the cylindrical bolt 60 in the threaded hole 57, the engine body 50 can be sandwiched with certainty between the one pivot plate 26 and the one end of the cylindrical bolt 60 while absorbing a dimension error between the pivot plates 26, 26 and an error of the widthwise dimension of the engine body 50. In addition, since the increased diameter head portion 52a at the one end of the mount bolt 52 is engaged with the first arresting portion 54 of the one pivot plate 26 and the nut 63 screwed on the other end portion of the mount bolt 52 is engaged with the second arresting portion 58 of the other pivot plate 26, the opposite ends of the mount bolt 52 can be fastened to the vehicle body frame F such that the axial positions thereof are fixed firmly, and the supporting rigidity of the engine body 50 can be raised.

Furthermore, since the cylindrical check bolt 61 which contacts with the other end of the cylindrical bolt 60 is screwed in the threaded hole 57 such that it is positioned inwardly of the second arresting portion 58, the check bolt 61 can be contacted with the other end face of the cylindrical bolt 60 to effectively prevent loosening of the cylindrical bolt 60.

The intake air path portion 92 which extends linearly so as to introduce purified air from the air cleaner 87 disposed upwardly of the cylinder head 86 is connected to the side wall of an upper portion of the cylinder head 86 provided on the engine body 50. Furthermore, the first injector 100 for injecting fuel into the intake air path portion 92 from above is attached to the cleaner case 96 of the air cleaner 87, and the fuel tank 88 is disposed such that it covers a rear portion and an upper portion of the air cleaner 87. The first injector 100 is disposed forwardly of the center line C1 of the intake air path portion 92.

In particular, the first injector 100 is disposed at a position offset forwardly from the center line C1 of the intake air path portion 92. On the center line C1 of the intake air path portion 92, the bottom wall of the fuel tank 88 can be set to a comparatively low position while preventing interference thereof with the first injector 100. Accordingly, the capacity of the fuel tank 88 can be assured sufficiently.

Furthermore, the first injector 100 is disposed forwardly of the center line C2 of the oil filler 101 provided at a front portion of the fuel tank 88. Since the first injector 100 does not interfere with the fuel tank 88 on the center line C2 of the oil filler 101, the oil filler 101 can be set to a lower position. In addition, the first injector 100 is attached to the cleaner case 96 of the air cleaner 87 such that an upper portion thereof is disposed forwardly of the intersecting point P of the center lines C1 and C2 on a projected plan on a plane parallel to the center line C2 of the oil filler 101 and the center line C1 of the intake air path portions 92. Accordingly, the bottom wall of the fuel tank 88 can be set at a lower position forwardly of the center line C2 of the oil filler 101. Consequently, the capacity of the fuel tank 88 and the air cleaner 87 can be assured further sufficiently. In addition, upon oiling, it becomes easier to insert an oiling nozzle into the oil filler 101.

Furthermore, the second injector 103 for injecting fuel into the intake air path portion 92 is attached to a rear side portion of the throttle body 94 of the intake air path portion 92. Accordingly, the first injector 100 which injects fuel from above the intake air path portion 92 such that fuel having a comparatively low temperature is supplied so as to contribute to improvement of the output power of the engine E and the second injector 103 which can respond in high responsibility to operation of the engine E to inject fuel can be disposed utilizing the arrangement space of the intake air path portion 92 effectively in a well-balanced state.

The intake duct 105 extending forwardly from the air cleaner 87 disposed on the head pipe 22 at the front end of the vehicle body frame F is disposed below the head pipe 22. The first intake path 119 whose central portion in the widthwise direction is disposed on the center line C3 in the widthwise direction of the front wheel WF and the pair of left and right second intake paths 120 disposed on the opposite sides of the first intake path 119 are formed in the intake duct 105 such that the flow area of the first intake path 119 is greater than the total flow area of the pair of second intake paths 120. Furthermore, the first intake control valve 126, which closes the first intake path 119 upon low speed rotation of the engine E, is disposed in the first intake path 119 such that, upon high speed rotation of the engine E, the first intake control valve 126 opens the first intake path 119.

According to such a configuration of the intake duct 105 as described above, upon low speed operation of the engine E, that is, when the motorcycle is driven at a low speed because water or some other foreign article is liable to be flung up from the road surface, since the first intake path 119 disposed at a central portion in the widthwise direction on the center line C3 in the widthwise direction of the front wheel WF is in a closed state, water or some other foreign article can be prevented from being admitted into the air cleaner 87 to the utmost. On the other hand, upon high speed rotation of the engine E, since water or some other foreign article is not readily flung up from the road surface by running wind from forwardly, water or some other foreign article can be prevented from being admitted into the air cleaner 87 to the utmost. Furthermore, since the first intake path 119 having a greater flow area is opened, a comparatively great amount of air can be introduced into the air cleaner 87 so as to contribute to an increase of the output power of the engine.

Furthermore, the first intake control valve 126 is secured to the valve shaft 128 supported for rotation on the intake duct 105. The pair of second intake control valves 127 which individually vary the flow areas of the second intake paths 120 are secured to the valve shaft 128 such that, upon low speed rotation of the engine E, they individually open the second intake paths 120. However, upon high speed rotation of the engine E, they individually close the second intake paths 120.

Since the first intake control valve 126 and the second intake control valves 127 are controlled to open and close in this manner, upon low speed operation of the engine E, the intake air amount is suppressed to a low level. Consequently, fuel air mixture can be prevented from becoming lean also upon acceleration operation and appropriate rich fuel air mixture can be supplied to the engine E thereby to obtain a good acceleration performance. On the other hand, upon high speed operation of the engine E, the intake resistance can be reduced to raise the capacity efficiency of the engine E thereby to contribute to improvement of the high speed output power performance. In addition, since the first intake control valve 126 and the pair of second intake control valves 127 can be driven to open and close by driving the valve shaft 128 to rotate, the structure is simplified.

The baffles 122a disposed at positions spaced from the front end openings 120a such that gaps are formed between the baffles 122a and the front end openings 120a of the second intake paths 120 are attached to the intake duct 105. When external air is introduced into the air cleaner 87 from the second intake paths 120, water or some other foreign article can be prevented to the utmost from being admitted into the second intake paths 120 by the labyrinth structure by the baffles 122a.

In addition, the front end of the first intake path 119 is open forwardly at the front end of the intake duct 105 and the front end openings 120a of the second intake paths 120 are formed at a front end portion of the intake duct 105 such that they are open in a direction different from the front end opening direction of the first intake path 119. Therefore, upon high speed operation of the engine E, running wind can be introduced into the first intake path 119 efficiently to raise the intake efficiency. On the other hand, upon low speed rotation of the engine E, a foreign article or water can be made less likely to be admitted into the second intake paths 120 for introducing air.

A front end portion of the intake duct 105 is formed in a substantially triangular shape such that, as viewed from the front, an upper edge thereof extends along the lower end edges of the joining portions of the head pipe 22 and the main frames 23, and a lower edge portion thereof extends along an upper portion of the radiator 89 disposed below the intake duct 105. Consequently, the intake duct 105 can be disposed efficiently in the space between the joining portions of the head pipe 22 and the main frames 23 and the radiator 89 while the size of the opening at the front end portion thereof is increased.

Furthermore, since the actuator 141 carried on the motorcycle for driving the exhaust control valve 156 which is controlled in response to the speed of rotation of the engine E is connected to the first and second intake control valves 126 and 127 in order to drive the first and second intake control valves 126 and 127 to open and close, the first and second intake control valves 126 and 127 can be driven while increase of the number of parts is prevented and compaction and reduction in weight of the intake apparatus are achieved.

Incidentally, the first intake control valve 126 is secured to the valve shaft 128 supported for rotation on the intake duct 105 and having an axial line perpendicular to the flowing direction of air flowing in the first intake path 119 so as to assume a rearwardly upwardly inclined posture where the first intake path 119 is in a closed state. The structure just described is advantageous in prevention of admission of water or some other foreign article into the air cleaner 87 side. In particular, while water or some other foreign article flung up by the front wheel WF is liable to be admitted into an upper portion of the front end opening of the first intake path 119, when the first intake control valve 126 starts its movement from the closed state toward the open side, even if water or some other foreign article flung up is admitted into the front end opening of the first intake path 119, it is likely to collide with the first intake control valve 126, and the water or some other foreign article can be blocked from passing the first intake control valve 126 and being admitted into the air cleaner 87 side.

Furthermore, the first intake control valve 126 is formed such that the area of a portion thereof higher than the valve shaft 128 in the closed state is greater than the area of the other portion thereof lower than the valve shaft 128. This is more advantageous to prevent admission of foreign articles into the first intake path 119.

Incidentally, the axle 68 of the rear wheel WR is supported for rotation at the rear end of the swing arm 66 having a front end portion supported for rocking motion on the vehicle body frame F, and the rear end exhaust portion of the exhaust system 150 connected to the cylinder head 86 provided on the engine body 50 carried on the vehicle body frame F forwardly of the rear wheel WR is disposed at a position higher than the axle 68. Furthermore, the exhaust control valve 156 for adjusting the flow area in the second collecting exhaust pipe 153 is disposed in the second collecting exhaust pipe 153, which forms part of the exhaust system 150. Thus, the exhaust control valve 156 is disposed forwardly and upwardly of the axle 68 of the rear wheel WR.

According to such an arrangement of the exhaust control valve 156 as described above, the exhaust control valve 156 can be disposed at a position spaced away from the supporting surface of the rear wheel WR at which it is less liable to be influenced from the rear wheel WR. Accordingly, the exhaust control valve 156 can be disposed in a good environment wherein operation thereof is less likely to be influenced from the rear wheel WR and the supporting surface.

In order to secure, to the first collecting exhaust pipe 152 which forms part of the exhaust system 150, the catalyst member 175 accommodated in the first collecting exhaust pipe 152 and having the case 176 formed cylindrically and made of a material different from that of the first collecting exhaust pipe 152, the bracket 178 made of the same material as that of the first collecting exhaust pipe 152 is welded to the inner circumferential face of the increased diameter portion 152a of the first collecting exhaust pipe 152, and the bracket 178 is coupled by caulking to the case 176 of the catalyst member 175.

Accordingly, also where the case 176 of the catalyst member 175 and the first collecting exhaust pipe 152 are made of different materials from each other, the catalyst member 175 can be accommodated in and secured to the first collecting exhaust pipes 152. Consequently, the degree of freedom in selection of the materials for the case 176 of the catalyst member 175 and the first collecting exhaust pipe 152 can be increased.

In addition, the catalyst member 175 is configured such that the catalyst carrier 177 formed in a column shape and allowing flow of exhaust gas therethrough is accommodated in the cylindrical case 176 such that one end thereof is disposed inwardly of one end of the case 176, and the bracket 178 is coupled by caulking to a portion of the one end of the case 176 which projects from the one end of the catalyst carrier 177. Consequently, the catalyst member 175 can be secured to the first collecting exhaust pipe 152 with a simple structure without having an influence on the catalyst carrier 177.

Furthermore, since the catalyst member 175 which does not have a movable element is disposed below the engine E in the exhaust system 150 and the exhaust control valve 156 which has a movable element is disposed rearwardly upwardly of the engine E in the exhaust system 150, the catalyst member 175 and the exhaust control valve 156 can be spaced away from each other in the exhaust system 150 and a bad influence of heat from the catalyst member 175 upon the exhaust control valve 156 can be suppressed.

While a working example of the present invention has been described, the present invention is not limited to the working example but allows various modifications without departing from the present invention as set forth in the claims.

As described above, according to the present invention, an exhaust control valve can be disposed in a good environment wherein a bad influence from a rear wheel and the supporting surface is less likely to be had on operation of the exhaust control valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle, comprising:
   a vehicle body frame;
   a swing arm supported at a front end portion thereof for rocking motion on said vehicle body frame;
   an axle of a rear wheel supported for rotation at a rear end of said swing arm;
   a cylinder head, said cylinder head being provided on an engine body, said engine body being supported on said vehicle body frame forwardly of said rear wheel;
   an exhaust system connected to said cylinder head, a rear end exhaust portion of said exhaust system being disposed at a position higher than said axle; and
   an exhaust control valve for adjusting a flow area in an exhaust pipe, which forms part of said rear end exhaust portion of said exhaust system, is disposed in said exhaust pipe,
   wherein said exhaust control valve is disposed forwardly and upwardly of said axle of said rear wheel.

2. The motorcycle according to claim 1, wherein in a low or medium speed rotational region of the engine, said exhaust control valve is operated to a closing side in order to utilize an exhaust gas pulsation effect in the exhaust system to raise an output power of the engine, and in a high speed rotational region of the engine, the exhaust control valve is operated to an opening side in order to reduce an exhaust gas flow resistance in the exhaust system to raise the output power of the engine.

3. The motorcycle according to claim 1, wherein the exhaust control valve is located in an increased diameter portion of the rear end exhaust portion.

4. The motorcycle according to claim 3, wherein the exhaust control valve is secured to a valve shaft supported for rotation on the increased diameter portion of the rear end exhaust portion.

5. The motorcycle according to claim 4, wherein a bearing housing having a bottomed cylindrical shape is securely mounted on the increased diameter portion, and the valve shaft is supported at one end thereof on the bearing housing through a first seal member.

6. The motorcycle according to claim 5, wherein another end of the valve shaft projects from the increased diameter portion with a second seal member interposed between the increased diameter portion and the valve shaft, and a driven pulley is secured to the projecting end of the valve shaft.

7. An exhaust system for a motorcycle, comprising:
an exhaust pipe, said exhaust pipe being connectable to an engine of the motorcycle, a rear end exhaust portion of the exhaust pipe being mountable at a position higher than an axle of a rear wheel of the vehicle; and
an exhaust control valve for adjusting a flow area in said exhaust pipe, said exhaust control valve being disposed in said rear end exhaust portion of said exhaust pipe,
wherein said exhaust control valve is disposed forwardly and upwardly of the axle of said rear wheel.

8. The exhaust system according to claim 7, wherein in a low or medium speed rotational region of the engine, said exhaust control valve is operated to a closing side in order to utilize an exhaust gas pulsation effect in the exhaust system to raise an output power of the engine, and in a high speed rotational region of the engine, the exhaust control valve is operated to an opening side in order to reduce an exhaust gas flow resistance in the exhaust system to raise the output power of the engine.

9. The exhaust system according to claim 7, wherein the exhaust control valve is located in an increased diameter portion of the rear end exhaust portion.

10. The exhaust system according to claim 9, wherein the exhaust control valve is secured to a valve shaft supported for rotation on the increased diameter portion of the rear end exhaust portion.

11. The exhaust system according to claim 10, wherein a bearing housing having a bottomed cylindrical shape is securely mounted on the increased diameter portion, and the valve shaft is supported at one end thereof on the bearing housing through a first seal member.

12. The exhaust system according to claim 11, wherein another end of the valve shaft projects from the increased diameter portion with a second seal member interposed between the increased diameter portion and the valve shaft, and a driven pulley is secured to the projecting end of the valve shaft.

13. A motorcycle, comprising:
an axle of a rear wheel supported for rotation at a rear end of a swing arm;
an exhaust pipe, said exhaust pipe being connectable to an engine of the motorcycle, a rear end exhaust portion of the exhaust pipe being mounted at a position higher than an axle of a rear wheel of the vehicle; and
an exhaust control valve for adjusting a flow area in said exhaust pipe, said exhaust control valve being disposed in said rear end exhaust portion of said exhaust pipe,
wherein said exhaust control valve is disposed forwardly and upwardly of the axle of said rear wheel.

14. The motorcycle according to claim 13, wherein in a low or medium speed rotational region of the engine, said exhaust control valve is operated to a closing side in order to utilize an exhaust gas pulsation effect in the exhaust system to raise an output power of the engine, and in a high speed rotational region of the engine, the exhaust control valve is operated to an opening side in order to reduce an exhaust gas flow resistance in the exhaust system to raise the output power of the engine.

15. The motorcycle according to claim 13, wherein the exhaust control valve is located in an increased diameter portion of the rear end exhaust portion.

16. The motorcycle according to claim 15, wherein the exhaust control valve is secured to a valve shaft supported for rotation on the increased diameter portion of the rear end exhaust portion.

17. The motorcycle stem according to claim 16, wherein a bearing housing having a bottomed cylindrical shape is securely mounted on the increased diameter portion, and the valve shaft is supported at one end thereof on the bearing housing through a first seal member.

18. The motorcycle according to claim 17, wherein another end of the valve shaft projects from the increased diameter portion with a second seal member interposed between the increased diameter portion and the valve shaft, and a driven pulley is secured to the projecting end of the valve shaft.

19. The motorcycle according to claim 1, wherein said exhaust control valve is located in said exhaust pipe between a first muffler and a second muffler of said exhaust system.

20. The motorcycle according to claim 1, wherein said exhaust control valve is located in said exhaust pipe at a location rearward of the cylinder head.

21. The exhaust system according to claim 7, wherein said exhaust control valve is located in said rear end exhaust portion of said exhaust pipe between a first muffler and a second muffler of the exhaust system.

22. The exhaust system according to claim 7, wherein said exhaust control valve is located in said rear end exhaust portion of said exhaust pipe at a location rearward of the engine.

23. The motorcycle according to claim 13, wherein said exhaust control valve is located in said rear end exhaust portion of said exhaust pipe between a first muffler and a second muffler of the exhaust system.

24. The motorcycle according to claim 13, wherein said exhaust control valve is located in said exhaust pipe at a location rearward of the engine.

* * * * *